United States Patent [19]
Timmermans

[11] Patent Number: 5,543,925
[45] Date of Patent: Aug. 6, 1996

[54] PLAYBACK APPARATUS WITH SELECTIVE USER PRESET CONTROL OF PICTURE PRESENTATION

[75] Inventor: Josef M. K. Timmermans, Hasselt, Belgium

[73] Assignee: U.S. Philips Corporation, New York, N.Y.

[21] Appl. No.: 982,739

[22] PCT Filed: Sep. 13, 1991

[86] PCT No.: PCT/NL91/00169

§ 371 Date: Jul. 16, 1993

§ 102(e) Date: Jul. 16, 1993

[87] PCT Pub. No.: WO92/05657

PCT Pub. Date: Apr. 2, 1992

[30] Foreign Application Priority Data

Sep. 19, 1990 [EP] European Pat. Off. .............. 90202487
Sep. 27, 1990 [NL] Netherlands ........................... 9002110

[51] Int. Cl.⁶ .................. H04N 9/79; H04N 5/76
[52] U.S. Cl. ................. 358/310; 358/342; 358/451; 369/47
[58] Field of Search .................................. 358/342, 403, 358/444, 448, 451, 452, 453, 335, 310; 369/47, 32; H04N 5/76, 9/79, 5/92

[56] References Cited

U.S. PATENT DOCUMENTS

| | | | |
|---|---|---|---|
| 4,922,476 | 5/1990 | Kiyoura et al. | 369/47 |
| 5,241,659 | 8/1993 | Parulski et al. | 358/335 |
| 5,257,253 | 10/1993 | Otsubo et al. | 358/342 |
| 5,270,831 | 12/1993 | Parulski et al. | 358/403 |
| 5,315,400 | 5/1994 | Kurata et al. | 358/342 |
| 5,337,236 | 8/1994 | Fogg et al. | 364/424.04 |

FOREIGN PATENT DOCUMENTS 0265167  4/1988  European Pat. Off. .

*Primary Examiner*—Thai Q. Tran
*Attorney, Agent, or Firm*—Edward W. Goodman

[57] ABSTRACT

Pictures, stored in compressed, digitized form on a digital data base medium are reproducible on a screen or the like with either a prerecorded presentation format, or a user-defined presentation. Prerecorded presentation parameter settings are stored in the medium along with the picture data. An additional memory is used to store the user-defined settings data. The user selects whether, on any given viewing occasion, to view pictures according to the settings stored in the data base medium or those stored in the additional memory. The additional memory is either fixed in the medium reader, or is removable for use with other readers.

15 Claims, 15 Drawing Sheets

PLAYBACK APPARATUS WITH SELECTIVE USER PRESET CONTROL OF PICTURE PRESENTATION

BACKGROUND OF THE INVENTION

1. Field of the Invention

The invention relates to a digitized picture playback apparatus or device for retrieving pictures from a first digital data base medium in which digitized pictures have been stored, the device comprising a read unit for reading the digitized pictures from the first digital data base medium in accordance with first control information, and a picture processing unit for convening the read digitized pictures into a picture signal suitable for reproduction means for reproducing a visible representation of the digitized picture, the picture processing unit convening the read-out digitized picture in accordance with second control information in order to effect an adaptation of the reproduction of the digitized picture.

The invention also relates to a method for use with a digital picture processing system wherein a plurality of pictures are digitized and written to a first digital data base, the contents of said first digital data base being capable of being read by a picture playback device which contains a digital data base access controller for controllably accessing a digitized picture stored by said first digital data base and, in response to the contents of a digitized picture accessed from said first digital data base, controllably outputting picture display control signals for controlling the operation of a picture reproduction device, so that the picture accessed from said first digital data base is displayed thereby. The manner in which said picture playback device causes said picture reproduction device to display a picture is controlled by a method which comprises the step of storing first control information through which said controller (a) controls the accessing of a digitized picture from said first digital data base and (b) outputs reproduction device control signals.

2. Description of the Related Art

Such a device and method are known, inter alia from the book "Compact Disc Interactive, a designer's overview", published by Kluwer (ISBN 9020121219). This book describes the so-called CD-I system. This system enables digitized pictures to be recorded on a Compact Disc. The digitized pictures can be read from the Compact Disc by means of a CD-I player and subsequently a representation of the digitized picture thus read can be displayed on a display screen.

Photographic still pictures, such as those captured by way of a 35 mm camera, may be digitized and recorded on the CD-I disc, for subsequent playback on the CD-I player. The output of the CD-I player drives a reproduction device, such as a consumer television set or color thermal printer.

One of the key aspects is the manner in which the digitized pictures are stored to obtain a file format that facilitates both the storage and retrieval of pictures for reproduction by a variety of devices, the resolution of which may vary from device to device.

In particular, when a photographic picture capture medium, such as a 24 or 36 frame, 35 mm film strip, is scanned by a high resolution scanner to digitize the respective pictures that have been captured on the film, each digitized picture may be subjected to a compression operator that "down-converts" a very high resolution picture file, (e.g., 2048 lines by 3072 pixels/line file) into an iterative set of residue picture files and a base, or low, resolution file, (e.g. a 512 lines by 768 pixels per line array representative of the picture). In an example of a preferred compression, each (512×768) base resolution file may be formatted as a set of four interlaced (256 lines by 384 pixels per line) picture sub-arrays, respectively defined by four sub-arrays of pixels within the 512×768 base resolution array, corresponding to odd pixel/odd line, odd pixel/even line, even pixel/odd line, even pixel/even line sub-arrays.

The size of both the base resolution file and its interlaces sub-fields are chosen to facilitate the implementation and incorporation of a low cost, reduced complexity frame store/data retrieval architecture into a conventional CD player, which provides for rapid call-up and display of selected pictures on a consumer television color monitor. Each captured picture may be digitized by the scanner and preferably stored "as is", regardless of its orientation on the film. A header file may be annexed to each picture. This header file may contain orientation, aspect ratio and other minilab operator-generator information that is readable by the data retrieval microcontroller of a CD player, to control the interfacing of the base resolution data file from the compact disc to a reproduction device (e.g., TV display).

Now although an optical compact disc is a very high quality density storage medium, it is a write-once or permanent medium; it cannot be erased or altered. Moreover, in order to provide a substantial degree of reproductive flexibility to the user, the contents of the picture file and its associated header, as prepared by the photofinishing minilab operator, are defined to optimize predefined picture characteristics (scene balance) and to indicate how the picture has been captured and digitized, rather than tailor the stored picture file for playback on a particular reproduction device. Further adjustment of parameters of the reproduced picture is left to the user. Thus, where the reproduction device is a consumer television monitor, the customer/user may selectively customize the manner in which a picture file is displayed by the operation of a player/display control unit (e.g., hand-held IR transmitter) which drives video display software resident in the player. Indeed, from a practical standpoint, it can be expected that in any given roll of film, there will be one or more pictures that a user may find less than interesting or may wish to modify (e.g., enlarge, crop) to a preferred presentation.

Because a color picture effectively consists of an extremely large set of parallel information sources, the degree of freedom associated with the modification of a digitized color picture provides the user with practically an infinite number of possible alternative appearances for the base picture file, so that customization of even a single picture may involve both creativity and the expenditure of a non-substantial period of time.

SUMMARY OF THE INVENTION

It is an object of the invention to provide means which result in a reduction of time which a consumer spends on customization.

With regard to the playback device, this object is achieved in that the device as defined in the opening paragraph comprises means for storing, in a second data base medium, second control information for the control of the selective adaptation of the reproduction for a plurality of individual digitized pictures.

With regard to the method, this object is achieved by a method as defined in the opening paragraph by the steps of b) providing a second digital data base which is configured to be coupled with said playback device and the contents of which are readable by and alterable by said controller, c) storing, in said second digital data base, second control information for defining picture display characteristics of one or more digitized pictures stored by said first digital data base, and d) causing said controller to access second control information that has been stored by said second digital and to control the display of a picture stored by said first digital data base in accordance with second control information.

For the device and method according to the invention, the consumer has to customize each picture only one time. Later on, he can use the control information stored in the second data base medium. The present invention is particularly directed to a digitized picture playback apparatus for use with a digital picture processing system wherein a plurality of photographic pictures that have been captured on a photographic recording medium, such as a 35 mm film strip, are digitized and written to an optical compact disc by way of a photoprocessing minilab workstation. The compact disc is then supplied to the customer for playback on a CD player and display on the customer's home television set. The CD player's microcontroller reads on the contents of a digitized picture file. The associated second control information (picture parameter data) entered by the consumer during the customization is stored in the second data base medium. So the consumer has to custumize the picture reproduction only one time. Later on, the picture parameter data generated during this customization are automatically read from the second data base medium.

It is to be remarked that EP-A-0,169,597, corresponding to U.S. Pat. No. 4,779,252, discloses a compact disc equipped with an auxiliary internal memory through which a user may specify a list of favorite songs to be sequenced on playback, rather than having the player access all of the audio files in the order in which they have been recorded.

However this feature relates only to the storage of a preferential playing sequence and not to the storage of control data for the control of the reproduction of individual associated information parts, such as the picture parameter data which is used to control the display of an associated picture.

An embodiment of the playback device is characterized in that the first data base medium comprises a record carrier provided with a record carrier identification, the second data base medium being adapted to store, together with the associated record carrier identification, the second control information for the coded pictures recorded on the record carrier, means for detecting the record carrier identification recorded on the record career, and means for extracting the associated second control information from the second data base medium after detection of the record carrier identification and transferring said second control information to the picture processing unit.

This embodiment has the advantage that the playback device automatically accesses to relevant picture parameter data for the pictures recorded on a record carrier for which already picture parameter data has been stored in the memory.

Another embodiment of the playback device is characterized in that the device comprises a digital data base access controller which controllably accesses a digitized picture stored by said first digital data base medium and, in response to the contents of a digitized picture accessed from said first digital data base, controllably outputs picture display control signals for controlling the representation of the picture, memory means which stores the first control information through which said digital data base access controller controls the accessing of a digitized picture from said first digital data base and outputs display control signals;

input means for supplying to said digital data base access controller the second control information for defining picture display characteristics of one or more digitized pictures stored by said first digital data base, so as to cause said controller to control the display of a digitized picture stored by said first digital data base in accordance with said second control information;

the second data base medium being configured to be removably engageable with said device and the contents of which are readable by and alterable by said controller; and interface means, coupled with said controller, for storing, in said second digital data base, said second control information, so that said second data base, upon being removed from said playback device, will contain said second control information.

This embodiment enables a user to save the picture parameter data of a customized picture; not only for future reproduction on the very reproduction device that has been used to customize one or more pictures stored on the disc, but also for future playback on other playback devices, for example that belonging to a relative or neighbor.

The invention will now be described in more detail, by way of example, with reference to FIGS. 1 to 27.

DESCRIPTION OF THE PREFERRED EMBODIMENT

Figure 1A:
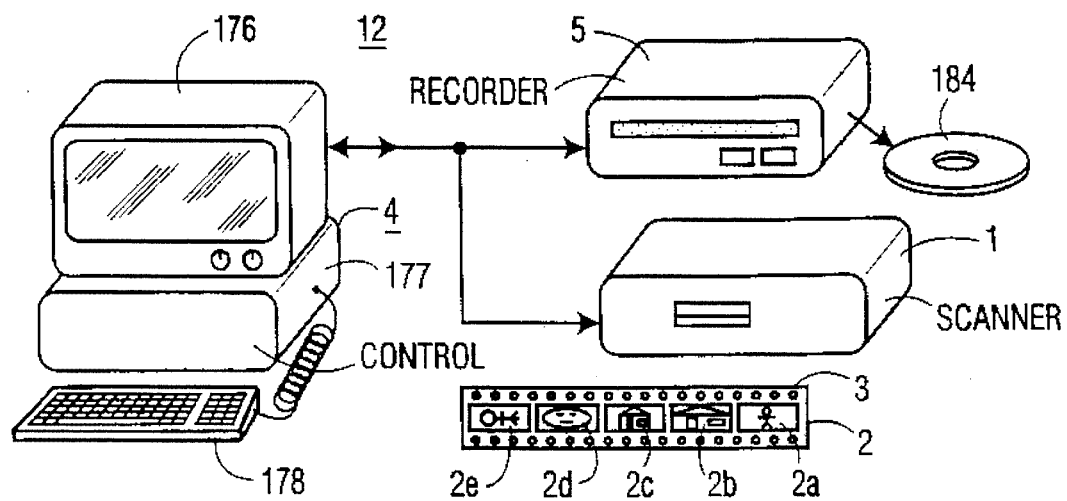
FIGS. 1a, 1b and 1c show a picture-storage system, a picture retrieval and reproduction system, and a simplified picture retrieval and reproduction system, respectively.

Before describing, in detail, the particular improved picture parameter data storage and retrieval mechanism in accordance with the present invention, it should be observed that the present invention resides primarily in a novel structural combination of conventional signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the figures do not necessarily represent the mechanical structural arrangement of the exemplary system, but are primarily intended to illustrate the major structural components of the system in a convenient functional grouping, whereby the present invention may be more readily understood.

FIG. 1a shows a picture storage system 12 in which the invention can be used. The picture storage system 12 comprises a picture scanning unit 1 for scanning pictures on a photographic picture capture medium 3, for example, a 35 mm film strip. The picture scanning device 1 further comprises a picture digitizing unit for digitizing the picture information obtained upon scanning. The digitizing picture information is recorded on a data base medium, e.g., a record carrier 184, by means of a recording unit 5 under control of a control unit 4. Prior to recording, the control unit 4 can apply an optional picture processing, for example, to enhance, correct or edit the picture representation defined by the digitized picture information. For this purpose, the control unit may comprise picture processing means which are known per se. The recording unit 5 may comprise, for example, an optical, a magnetic or a magneto-optical recording device. In view of the high storage capacity of optical and magneto-optical record carriers, it is preferred to use an optical or a magneto-optical recording device. The control unit 4 may comprise a computer system, for example, a so-called "personal computer" or a so-called workstation with suitable hardware and application software.

Figure 1B:
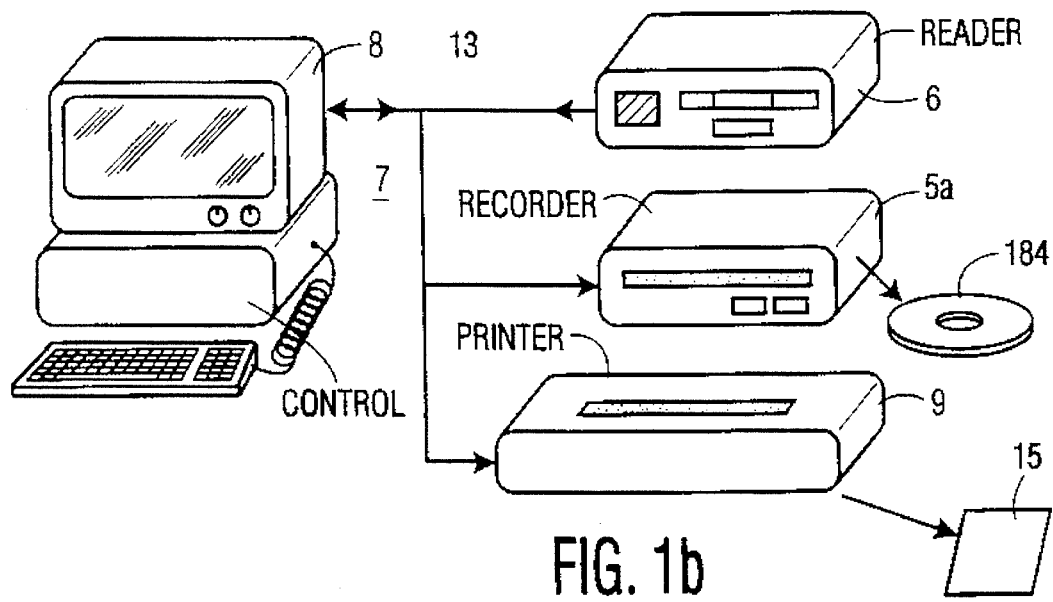

FIG. 1b shows a picture retrieval and reproduction system for retrieving and displaying representations of digitized pictures stored on the record carrier 184 by means of the picture storage system 12. The picture retrieval and reproduction system 13 comprises a read unit 6 for locating and reading out selected digitized pictures under control of a control unit 7. Representations of digitized pictures thus read can be made visible on a picture reproduction unit. Such a picture reproduction unit may comprise a display screen 8, which, for example, forms part of the control unit 7, or an electronic picture printer 9 for generating a hard copy 15 of a representation of the read-out digitized picture. The picture retrieval and reproduction system 13 may further comprise an additional recording device 5a, by means of which the digitized picture information read by means of the read device 6, can be recorded after an optional picture processing operation performed by the control unit 7 for the purpose of enhancement, correction or editing. The control unit in the picture retrieval and reproduction system 13 may comprise a computer system, for example, a "Personal Computer", or a workstation with suitable hardware and application software. Although such a system is very suitable for the control task to be performed and the optional picture processing, it has the drawback that it is comparatively expensive.

In general, it is desirable to have such an expensive computer system for the control unit in conjunction with the electronic picture printer 9 because of the complexity of the control and picture processing functions. However, if it is merely desired to display selected digitized pictures on a display screen, the computing capacity and storage capacity of a computer system in the form of a personal computer or workstation are high in comparison with the control functions to be performed. In that case, it is preferred to employ a simplified control unit with a limited computing and storage capacity and a limited data processing speed. The system as shown comprise a digitized picture playback device, which includes the read unit 6, and a picture processing unit which converts the digitized picture read by the read unit into a picture signal which is suitable for the reproduction unit (display screen 8 or printer 9). This picture processing unit may be comprised partly or completely into the read unit 6, the control unit 7 or the picture reproduction units 8 or 9.

Figure 1C:
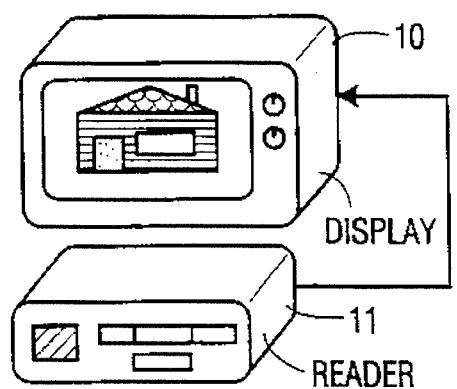

FIG. 1c shows a simplified picture retrieval and reproduction system 14. This simplified system 14 comprises a display unit 10 and a picture retrieval and a digitized picture playback device 11 comprising the read unit 6. A control unit for controlling the retrieval and read operation and, if applicable, limited picture processing can be accommodated in one of the units 10 and i 1, but suitably in the unit 11. When the control unit is accommodated in the retrieval and read unit 11, it is possible to employ, among others, a standard TV set or monitor unit for the picture display device.

This is an advantage, in particular, for consumer uses because the consumer then merely has to purchase the retrieval and read device to display the representations of the pictures.

As a result of their comparatively high cost, the picture storage system 12 shown in FIG. 1a and the picture retrieval and reproduction system 13 shown in FIG. 1b are particularly suitable for central uses, for example, in photoprocessing laboratories or photofinishing minilabs.

Figure 2:
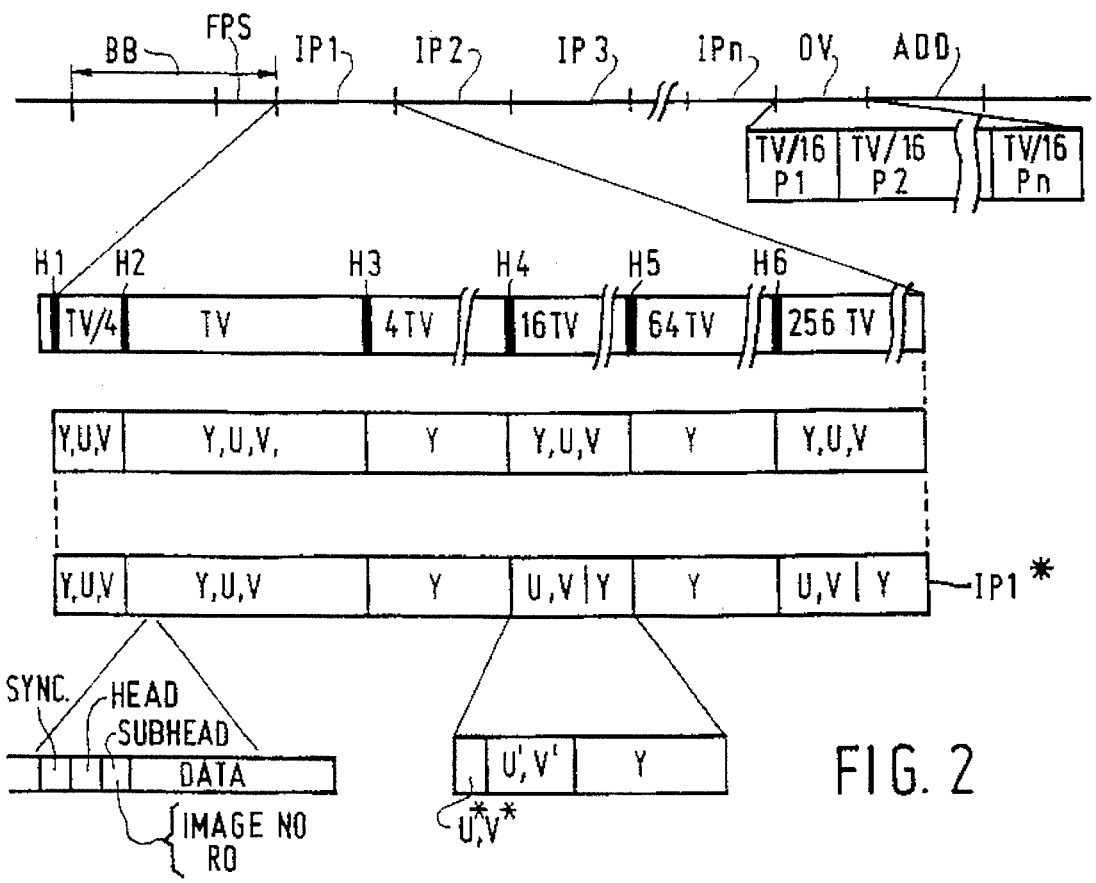
FIG. 2 shows a suitable format for recording picture information on a record carrier.

For recording digitizing picture information, it is preferred to record the information on the record carrier in a predetermined format and order. FIG. 2 shows a suitable format and order, in which files containing coded picture information bear the references IP1, . . . , IPn. Hereinafter, the files IP1, . . . , IPn will be referred to as picture files. Moreover, a plurality of control files BB have been recorded. These files contain a read out control data which is used for controlling the read-out of the digitized picture information and picture parameter data, for the purpose of performing optional picture processing operations on the picture information read and for the purpose of displaying representations of the digitized picture information. It is to be noted that the picture parameter data may be included in the picture files. The advantage of this is that the required picture parameter data becomes available at the instant at which it is needed, i.e., at the instant at which the picture file is read.

Apart from the picture files Ip and the associated control files BB, it may be desirable in a number of cases to record files with additional information, for example audio information or text information. Such audio and/or text information may relate to, for example, digitized picture information and can then be reproduced or displayed when the representations of the relevant digitized picture information are displayed. The files with additional information are referenced ADD and may be recorded, for example, after the coded picture information.

For every digitized picture stored, the picture files contain a plurality of subfiles, which each define a representation of the same scanned picture, the resolutions of the representations defined by these coded pictures being different. In FIG. 2, the different subfiles for the picture file IP1 bear the references TV/4, TV, 4TV, 16TV, 64TV, 256TV. The subfile TV defines a representation of the scanned picture with a resolution corresponding substantially to a standard NTSC or PAL TV picture. Such a picture may comprise, for example, 512 lines of 768 pixels each. The subfile TV/4 represents the scanned picture with a resolution which, in the horizontal and the vertical directions, has been reduced linearly by a factor of 2 relative to the resolution of the picture represented by the subfile TV. The subfiles 4TV, 16TV, 64TV and 256TV define picture representations whose horizontal and vertical resolution has been increased linearly by a factor of 2, 4, 8 and 16, respectively. Preferably, the subfiles are arranged in such a way that the resolutions of the representations defined by the successive digitized pictures increase (linearly) in steps of 2. During reproduction, when the consecutive subfiles are generally read successively, it is then simple to first display a representation of a picture of low resolution and, subsequently, to replace this representation wholly or partly by representations of the same picture of, each time, increasing resolution. This has the advantage that the waiting time before a picture representation appears on the display screen is minimized. Indeed, on account of the limited amount of information needed for this, the read-out time of a digitized picture defining a low-resolution representation is short in comparison with the read-out time of encoded pictures defining higher-resolution representations.

A generally known representation of pictures is that in which the picture is composed of a matrix of small areas of constant luminance value and/or constant color value. In this representation, it is customary to select the areas of constant color value to be larger than the areas of constant luminance value.

An area of constant color value will be referred to hereinafter as a color pixel and an area of constant luminance value will be referred to hereinafter as a luminance pixel. A row of color pixels of a width equal to the full picture width will be referred to hereinafter as a color picture line. A row of luminance pixels of a width equal to the full picture width will be referred to hereinafter as a luminance picture line. A picture represented by luminance picture lines and color picture lines can be defined simply by a digitized picture by assigning to each luminance pixel and color pixel a digital code specifying the relevant luminance value and color values. These digital codes will be referred hereinafter as digitized pixels.

Figure 3:
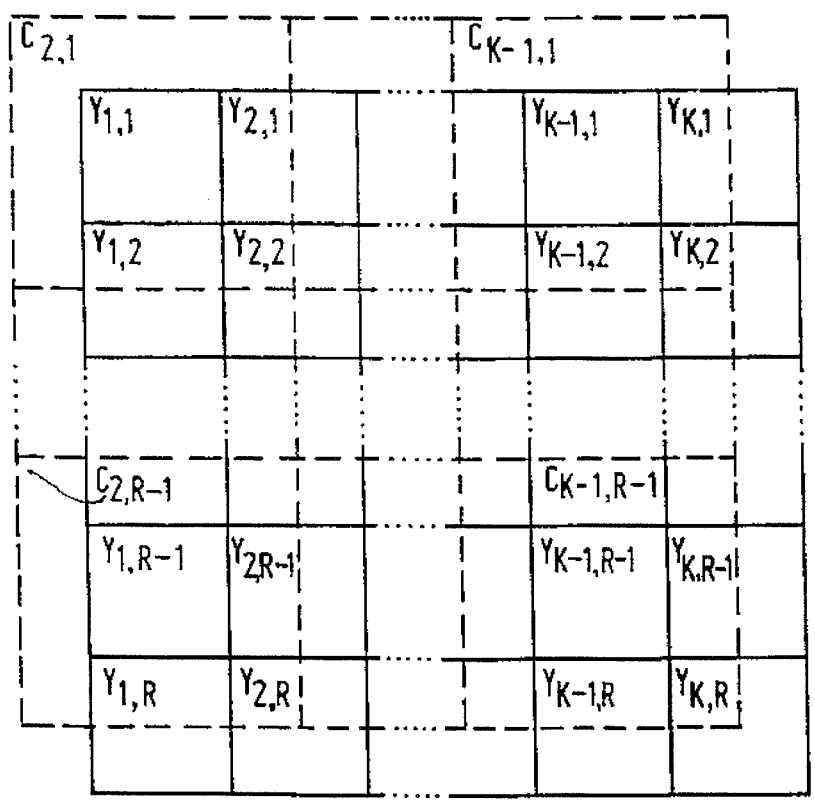
FIG. 3 illustrates a suitable method for digitizing the picture information.

FIG. 3, by way of illustration, shows the structure of a picture of color pixels and luminance pixels. The luminance pixels bear the reference signs $(Y_{2,1}; \ldots; Y_{K-1,R-1})$. The color pixels bear the reference signs $(C_{1,1}; \ldots; C_{K,R})$. It is to be noted that in FIG. 3, as is customary, the dimensions of the color pixels in the horizontal and the vertical directions are twice as large as the dimensions of the luminance pixels. This means that the resolution of the color information in the horizontal and the vertical directions is a factor of two lower than the resolution of the luminance information.

A suitable picture coding is that in which a digital code or digital codes is/are assigned to every luminance pixel and every color pixel the code(s) defining the absolute value of the luminance component Y and the absolute values of the color difference components U and V, respectively. Such a coding will be referred to hereinafter as an absolute picture coding. The digitized pictures achieved by absolute picture coding will be referred to hereinafter as absolutely coded pictures. Preferably, representations of a number of low-resolution pictures are recorded as absolutely coded pictures. This enables the picture information to be recovered in a simple manner. This is particularly advantageous for the simplified picture retrieval and reproduction system 14, because this enables the price of such a system, which is intended for the consumer market, to be kept low by the use of simple picture decoding systems.

The use of a picture file with a number of absolutely coded pictures of different resolutions simplifies the reproduction of representations of composite pictures, where a representation of a small low-resolution picture is displayed within the outline of a representation of a higher-resolution picture. The reproduction of such a representation of a composite picture is referred to as "Picture-in-Picture" ("PIP"). Moreover, recording a plurality of absolutely coded pictures defining representations of the same picture with different resolutions simplifies the reproduction of enlarged representations of details of a digitized picture. Such a function is also referred to as the TELE-functions, (or ZOOM-function). The availability of absolutely coded pictures with different resolutions implies that for some of the TELE functions and PIP functions the required picture information is directly available and need not be derived by means of additional picture processing operations to be performed by complex circuits.

In the recording of picture information, it is customary to record the digitized pixels in rows (or lines) or sometimes in columns. Recording in lines is to be preferred because in the customarily used picture display units, the picture information should be presented in the form of lines.

For high resolutions, the storage of absolutely coded picture information has the drawback that the amount of information to be recorded is very large. For such high-resolution pictures, a residual coding is very suitable. In such a residual coding, differences between the signal value of the pixels of the high-resolution picture and the signal value of the corresponding past of the lower-resolution picture are determined and subsequently encoded.

Figure 4:
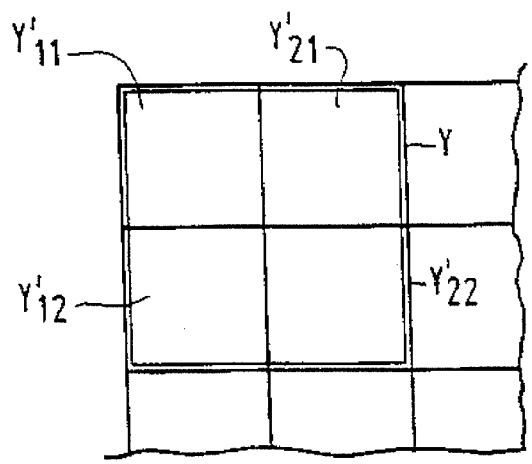
FIG. 4 illustrates a suitable residual coding to be used for in digitizing picture information.
Figure 5:
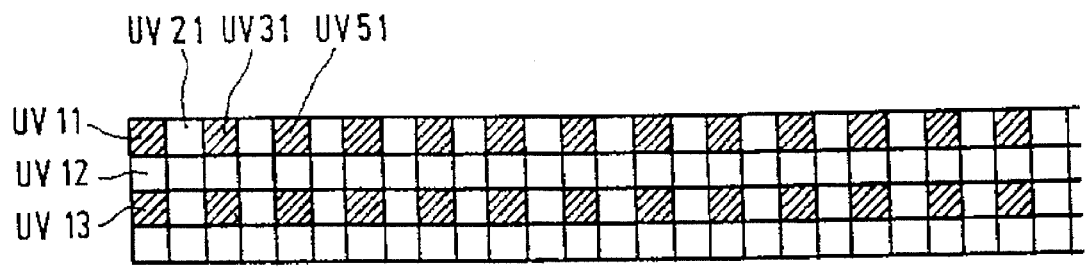
FIG. 5 illustrates a suitable arrangement of the color information of a picture for a series of digitized pictures of increasing resolutions.

To illustrate this coding method, FIG. 4 shows one luminance pixel Y of a low-resolution picture and four luminance pixels $Y_{1,1}'$; $Y_{2,1}'$; $Y_{1,2}'$ and $Y_{2,2}'$ of the corresponding higher-resolution picture in the case that the horizontal and the vertical resolution is increased by a factor of 2. Instead of the absolute luminance value of the luminance pixels $Y_{1,1}', \ldots, Y_{2,2}$; the residual coding encodes differences (hereinafter referred to as residual values) between the luminance values of the luminance pixels $Y_{1,1}', \ldots, Y_{2,2}'$ and the luminance pixel Y. In this way, the residual values of a complete picture can be determined both for the luminance and for the color information. As the number of residual values equal to zero or being very small is large in comparison with the number of large residual values, a substantial data compression can be obtained by applying an additional coding in which the residual values are non-linearly quantized and are subsequently subjected to, for example, a Huffman coding. A digitized picture achieved by the above residual coding will be referred hereinafter as a residually coded picture.

A residually coded picture can be used as a basis for a new residual coding for a picture with further increased resolutions. Thus, by recording one absolutely coded low-resolution picture and a series of residually coded pictures of increasing resolutions in compressed form, it is possible to record a plurality of digitized pictures defining representations of the same picture with increasing resolutions. In the picture file IPI shown in FIG. 2, the pictures in the subfiles TV/4 and TV are absolutely coded and the pictures in the subfiles 4TV, 16TV, 64TV and 256TV are residually coded, with non-linear quantization and Huffman coding.

The color information is also coded residually in a way similar to the luminance information. However, the horizontal and the vertical resolution of the consecutive residually coded color information increases by a factor of four instead of by a factor of two as with the luminance information. This means that a picture file containing only residually coded luminance information and no color information (4TV and 64TV) alternates with a picture file containing both residually coded luminance information and residually coded color information (16TV and 256TV), see FIG. 2. Leaving out the color information in the subfiles 4TV and 64TV reduces the required storage capacity and the access time to the coded picture information in the picture file. However, the absence of the color information in the sub files 4TV and 64TV need not adversely affect the picture quality during reproduction. This is because during the reproduction of a representation of a digitized picture for which no color information has been recorded, the color information of the next coded picture defining a representation of higher resolution or the color information of the preceding coded picture defining a representation of lower resolution can be utilized. In order to reduce the total access time to the required picture information, it is to be preferred to record the color information U, V in the subfiles 16TV and 256TV contiguously to the luminance information Y in the subfiles 4TV and 64TV, as is illustrated for the file IP* in FIG. 2.

As already stated, it is customary to record the digitized pixels line by line.

The stored digitized pictures generally define a number of pictures with a "horizontal" orientation or landscape format (i.e., for a faithful reproduction, the picture should be displayed in an orientation in which the width of the picture is larger than the height of the picture) and a number of pictures with "vertical" orientation or portrait format (i.e., for a faithful reproduction, the picture should be displayed in an orientation in which the height of the picture is larger than the width of the picture).

By way of illustration, FIG. 1 shows a picture capture medium 3 with some pictures in landscape format (2a, 2b, 2c and 2d) and one picture in portrait format (2e). On the record carrier, all the digitized pictures are recorded as though they were representations of pictures in landscape format. This is in order to enable a uniform picture scanning to be used without the necessity to detect whether the scanned picture is of the landscape or portrait type and to change over the scanning and/or picture processing depending upon the detection result. However, this means that during reproduction, the representations of portrait format pictures will be displayed with an incorrect orientation. This can be precluded by providing a possibility to assign a orientation code to the recorded coded pictures, this code indicating the orientation of the scanned picture. This code can be used to determine whether the representation should be rotated during reproduction and, if this is the case, whether the representation should be rotated through an angle of 90, 180 or 270 degrees. This orientation code can be included in every picture file IP1, . . . , Ipn. It is also possible to record these orientation codes in the control file BB or to store these orientation codes in a non-volatile memory arranged in the read unit or connected to this unit.

During reproduction, it is then possible to determine, on the basis of the orientation code, whether the representation to be displayed should be rotated and, if this is the case, a rotation through the desired angle can be performed prior to reproduction. A drawback of including the orientation codes in the picture files IP is that these rotation codes have to be determined already during scanning of the pictures. In practice, this means that an operator of the picture storage system should determine for each scanned picture whether the stored picture is to be rotated during reproduction, because the known auxiliary devices are not always capable of detecting whether a scanned picture is of landscape or portrait format and whether the picture is presented to the scanning unit with the correct orientation. This is undesirable in particular because it implies that an operator must be present during recording, which makes it difficult to realize a fully automated picture storage system 12.

Figure 6:
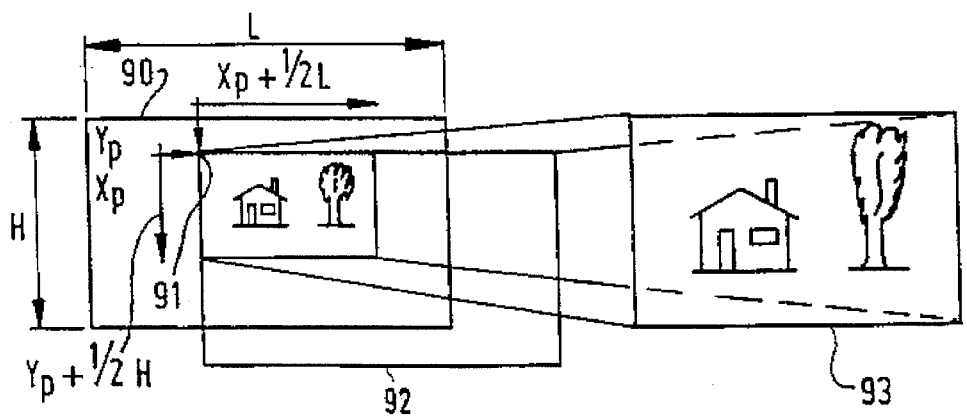
FIG. 6 illustrates an example of a picture processing function.

If the orientation codes are already available during recording of the digitized picture information, it will be advantageous to record these codes on the record carrier. In the case of the file organization shown in FIG. 2 a suitable position for recording the rotation codes is the subfile FPS of the control file BB. For reasons of user convenience, it is desirable to specify, apart from the required rotation, whether instead of a representation of stored coded pictures, a representation which is slightly shifted (to the left, right, top or bottom) should be displayed. This is certainly desirable if the display area within which the representation is to be displayed in a display unit is smaller than the dimensions of the representations, because it is possible that an important detail of the picture falls outside the display area. The desired shift can be specified by assigning a translation code to every digitized picture. In FIG. 6, a suitable translation coding for a picture 90 is defined by means of the coordinates xp and yp of a vertex 91 of the picture 90 to be displayed after translation. By means of a translation code and a magnification code, it is possible to specify the magnification factor with which a certain part of the original picture is to be displayed. The reference numeral 93 indicates an enlarged representation of a part of the picture 90, defined by a translation xp, yp and a magnification factor of 2. In addition to the above data, it is also possible to include other picture parameter data in the subfile FPS of the control file BB, such as, for example, parameters specifying a color or luminance adaptation and other picture processing operations to be applied before a representation of the coded picture is displayed. Moreover, it is advantageous to store the desired sequence in which the pictures must be reproduced in the subfile FPS within the control file BB.

Figure 7:
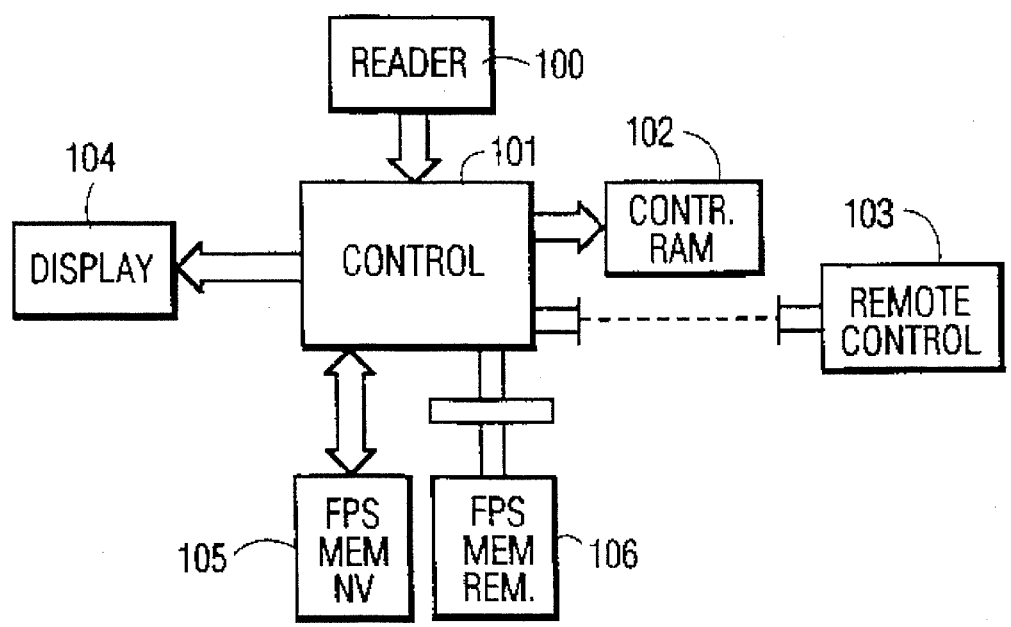
FIG. 7 shows an embodiment of a retrieval and reproduction system capable of displaying picture information in accordance with picture parameter data.

A collection of picture parameter data defining the preferred sequence as well as all the desired picture parameter data for all the coded pictures on a record carrier will be referred to hereinafter as a set of picture parameter data. It may be advantageous to record more than one set of picture parameters data in the file FPS. This enables a different display sequence and other picture processing operations to be selected by different persons, for example, persons within a family. It also allows a user to make a choice from different sets of picture parameter data. It is to be noted that when a record carrier of the write-once type is used, the sets of picture parameter data can be recorded on the record carrier only if they are available during initial recording. This requires human intervention during recording. During reading of the record carrier, a set of picture parameter data is selected and the representations of the coded pictures can be displayed in conformity with the selected set of picture parameter data. FIG. 7 is a block diagram of an embodiment of a picture retrieval and display system by means of which representations of coded pictures can be displayed in conformity with a selected set of picture parameter data. In this diagram, the reference numeral 100 refers to a read unit for reading the record carrier. For the purpose of applying the information being read, the read unit 100 is coupled to a control and signal processing unit 101. From the information received from the read device 100, the unit 101 selects the file FPS containing the set(s) of picture parameter data and stores this (these) set(s) in a control memory 102. By means of a data entry unit 103, for example, a remote control device, a user can select a set from the control memory 102 and can subsequently activate the unit 101 to start the read cycle, in which the digitized picture information is read in the sequence specified by the selected set of picture parameter data under control of the unit 101. After the digitized picture information has been read out, this information is processed in accordance with the selected set of picture parameter data and is applied to a display unit 104.

It may occur that after some time, the picture parameter data stored on the record carrier are no longer entirely in compliance with the user's wishes or that no or incorrect picture parameter data have been recorded on the record carrier. This is problematic, in particular if the record carrier is of a type which cannot be overwritten, because the recorded picture parameter data then cannot be adapted. This problem can be mitigated by providing the retrieval and display system in FIG. 7 with a digital data base medium, e.g., a non-volatile memory 105 in which together with a record carrier identification code, a new set of picture parameter data or information about the desired changes of the picture parameter data relative to the set of picture parameter data recorded on the record career is stored for the record carrier specified by means of the record career identification code. In view of the limited storage capacity of the non-volatile memory 105, it is desirable to record the information necessary for the picture parameter data in a most compact form, for which reason it is preferred to record the information about the changes of the picture parameter data.

Figure 8:
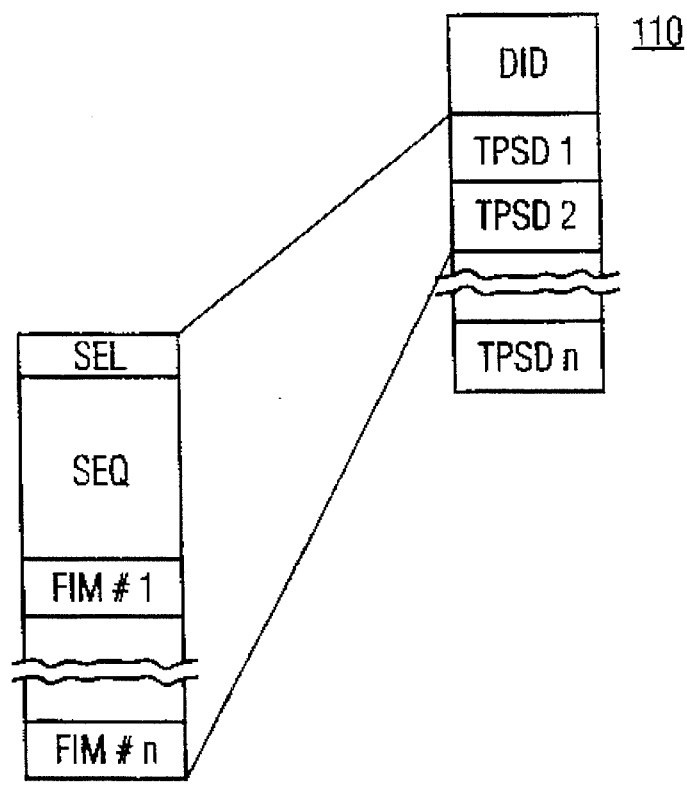
FIG. 8 shows a suitable format for recording picture parameter data on the record carrier.

FIG. 8 shows, by way of example, a suitable format 110 of the picture parameter data included in the file FPS on the record carrier. The format 110 comprises a section DID in which the unique record carrier identification code is stored. Such a code may comprise a large random number generated by means of a random-number generator and recorded on the record carrier. The code may comprise a time code indicating the time in years, months, days, hours, minutes, seconds and fractions of seconds. Alternatively, the record carrier identification code may comprise a combination of a time code and a random number. In the format 110, the section DID is followed by sections FPS1, FPS2, . . . , FPSn in, which a number of different sets of picture parameter data are stored. Each of the preferential reproduction setting sections FPS1, . . . , FPSn contains a portion SEL in which a set identification number for each of the different sets of picture parameter data to be selected by different users are specified, and a portion specifying the sequence SEQ in which the representations of the stored pictures are to be reproduced. This portion is followed by the coded sections FIM#1, . . . , FIM#n storing, for the pictures 1, . . . , n, the picture parameter data indicating preferential processing operations to be performed before the representation of the relevant picture are displayed.

Figure 9:
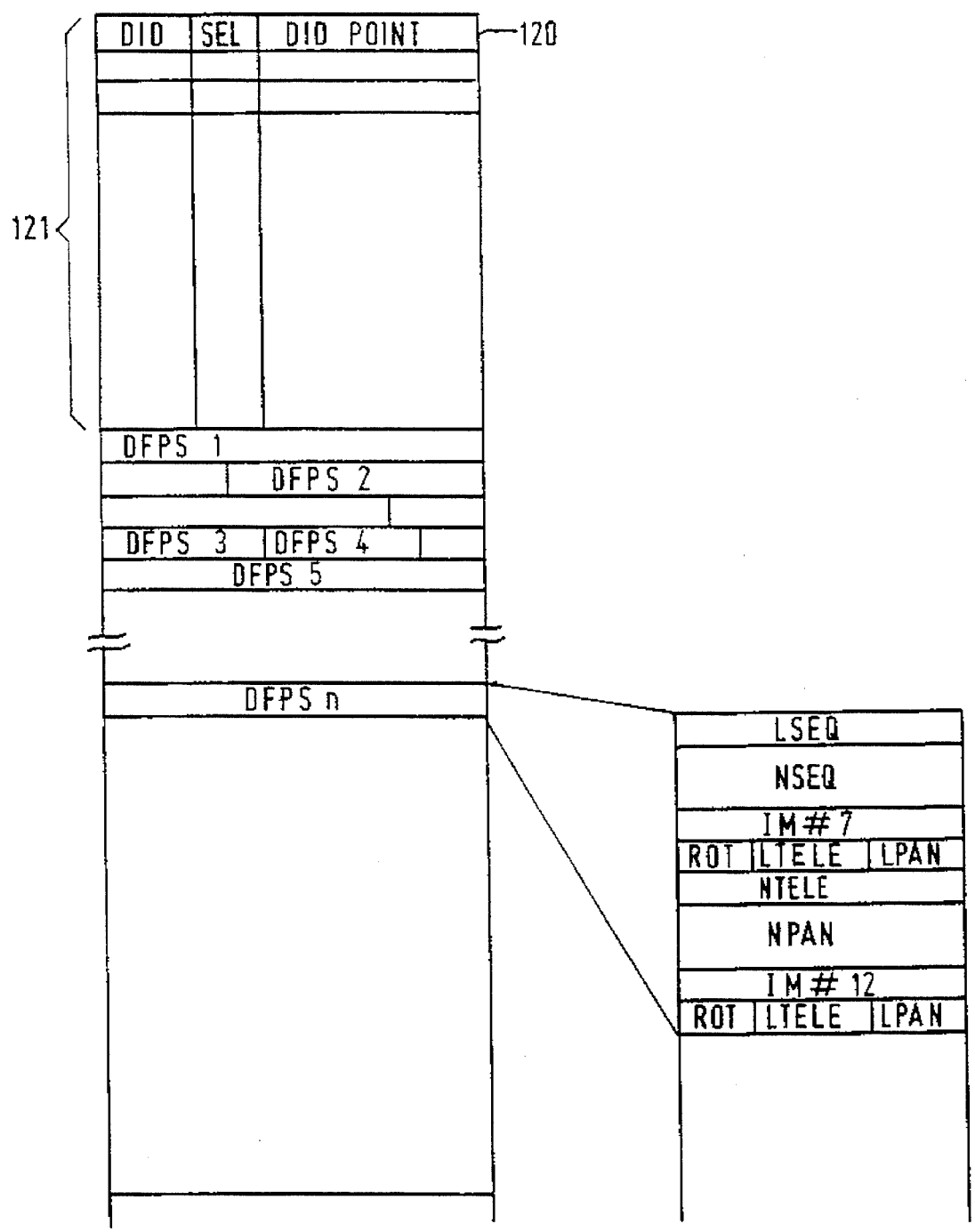
FIG. 9 shows a suitable format for storing picture parameter data in a nonvolatile memory.

FIG. 9 shows, by way of example, a suitable format 120 in which the information about the desired adaptations of the set of picture parameter data can be stored in the non-volatile memory 105. The format 120 comprises a section 121 specifying combinations of record carrier identifications and set identification numbers for which information about picture parameter data has been stored. To each of these combinations, a pointer is assigned, this pointer being included in the section DID-POINT and specifying the address of the sections DFPS1, . . . , DFPSn in the non-volatile memory 105.

Every section DFPS comprises a portion LSEQ with a code indicating the space (for example, in numbers of bytes) required to specify the new sequence. If the portion LSEQ indicates a length not equal to zero, LSEQ will be followed by a portion NSEQ with the data specifying the new display sequence. After NSEQ, the new preferential processing operations are specified for every picture with modified preferential processing operations. ROT indicates the section with the orientation code. The sections LTELE and LPAN specify the length available for the storage of the new data relating to picture magnification (in a section NTELE) and picture translation (in a section NPAND. In this way, it is possible to select the accuracy with which the picture processing information is to be stored. Thus, it is possible, for example, to define three different lengths indicating three different accuracies. LTELE and LPAN are followed by the portions NTELE and NPAN. If the information about the picture magnification and picture translation need not be changed, this is indicated by the length zero in LTELE and LPAN. By storing only the preferential processing operations for pictures with modified preferential processing operations, the space required for the storage of the new picture parameter data is reduced considerably. Apart from the reduction of the required storage space by said recording of the differences, it is possible to obtain an additional reduction by specifying the length required for the storage of modified data. When the record carrier is read, an adapted set of picture parameter data is derived from the picture parameter data recorded on the record carrier and the differences stored in the memory 105, and this adapted set is stored in the memory 102.

Instead of, or in addition to, the fixed non-volatile memory 105 a changeable memory 106, for example, in the form of a magnetic card, EPROM, EEPROM or NVRAM, can be employed for the storage of picture parameter data in the retrieval and display system shown in FIG. 7.

This has the advantage that a user can display the picture information on a record carrier in accordance with the same picture parameter data on different picture retrieval and display systems to which a changeable memory 106 can be connected. When one of the two or both memories 105 and 106 are used for the storage of picture parameter data, it is desirable that a selection is made from the different sets of picture parameter data defined by the sets of picture parameter data on the record carrier and by the modifications of the picture parameter data stored in the memories 105 and 106. For this purpose the unit 101 should comprise selection means: These selection means may be of a type which are operated by the user to make a choice from the various sets of picture parameter data defined for one specific record carrier and selection number by the picture parameter data information stored on the record carrier and in the memories 105 and 106. However, alternatively, these selection means may be of a type which, prior to reproduction on the basis of the contents of the memories 105 and 106 and the sets of picture parameter data recorded on the record carrier, determine the sets of picture parameter data available for the relevant record careers and store them, for example, in the memory 102. Subsequently, one of the available sets of picture parameter data in the memory 102 is selected in accordance with a predetermined selection criterion. Preferably, the selection criterion is such that the highest priority is assigned to the picture parameter data information in the changeable memory 106, medium priority to the picture parameter data information in the non-volatile memory, and the lowest priority to the picture parameter data on the record carrier. If the unit 101 comprises a computer, automatic selection can be realized by loading the computer with a suitable selection program.

Now reference is made again to the file OV in FIG. 2, which for all the picture files IP1, . . . , IPn, comprises a subfile TV/16 containing an absolutely coded low-resolution picture. Recording a file OV has the advantage that an overview of the digitized picture information recorded on the record carrier can be obtained with a minimal access time. This is possible, for example, by successively displaying the digitized pictures in the subfile TV/16 as representations which wholly or partly fill the display screen, preferably in the sequence defined by the selected set of picture parameter data. However, it is also possible to compose a representation in the form of a so-called mosaic picture from the subfiles. In this mosaic picture, a large number of representations of the coded low-resolution pictures contained in the subfiles TV/16 are arranged in the form of a matrix, preferably in an order dictated by the selected set of picture parameter data. By way of illustration FIG. 1 shows a mosaic picture 130 made up of the representations (IM#1, IM#3, . . . , IM#26) of sixteen low-resolution subfile pictures.

Figures 10, 11:
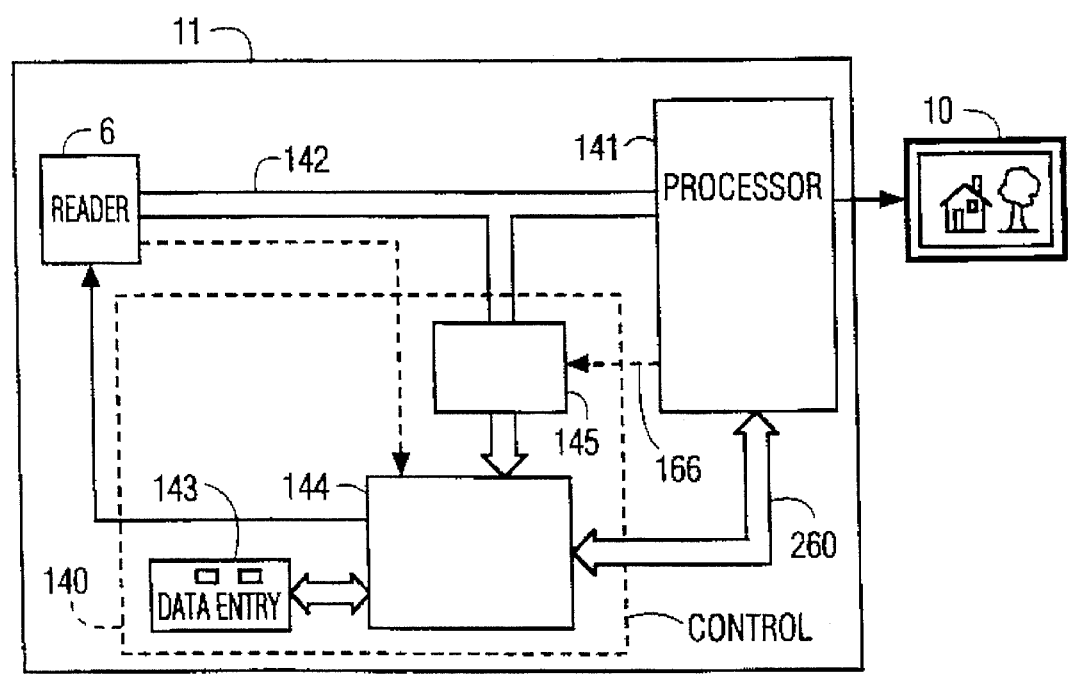
FIG. 10 shows a mosaic picture composed of sixteen low-resolution pictures.
FIG. 11 shows in greater detail an embodiment of the simplified picture retrieval and reproduction system.

FIG. 11 shows an embodiment of the picture retrieval and display system of FIG. 1c in more detail. In the present system, the picture retrieval and read unit 11 comprises the read unit 6, a control unit 140 and a picture processing unit 141. The read unit 6 supplies the information read from the record carrier to the control unit 140 and to the picture processing unit 141 via a signal path 142. The control unit 140 then selects specific information contained in the control files BB and IIDB from the information read. The picture processing unit 141 selects picture information from the information read and converts this picture information into a form suitable for the display unit 10. The read unit 6 and the picture processing unit 141 are controlled by the control unit 140 on the basis of the data entered by a user, for example, via a data entry unit 143, and on the basis of the control data in the control files BB and IIDB.

Figure 12:
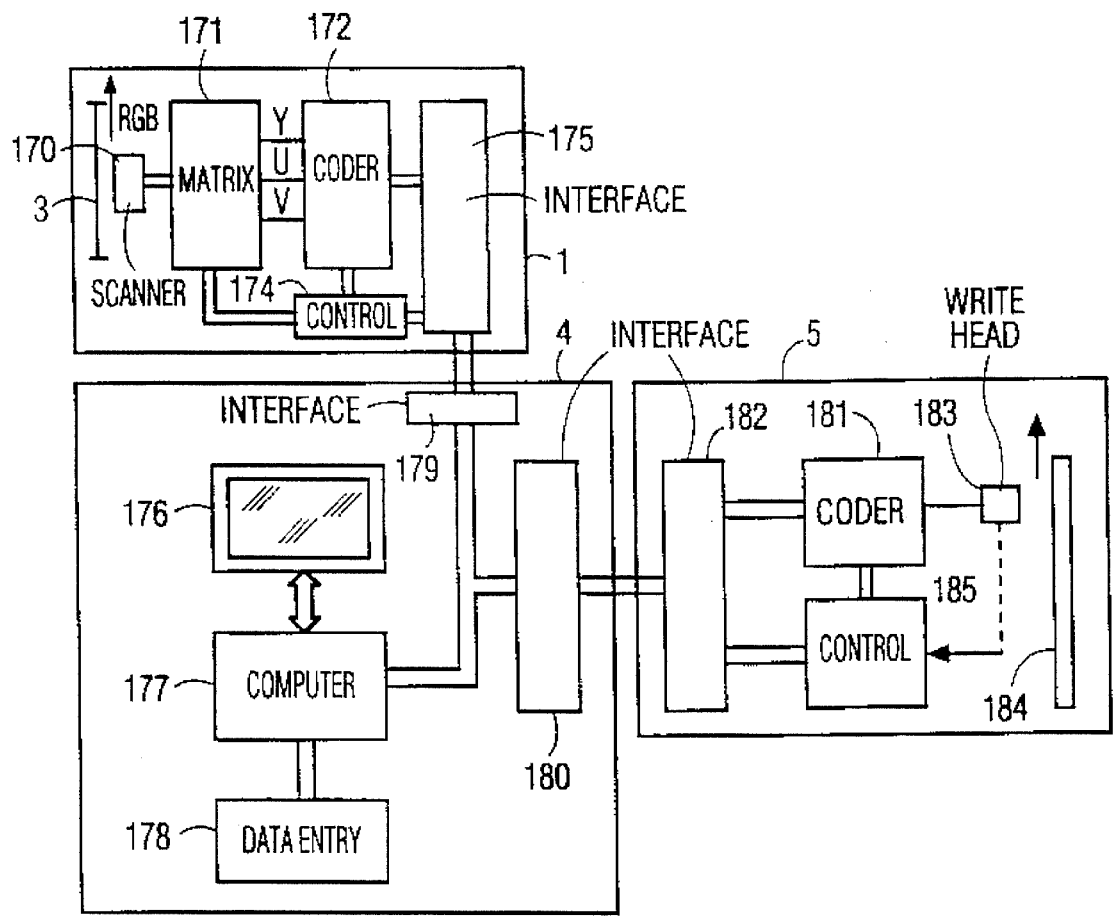
FIG. 12 shows in greater detail an embodiment of the picture storage system.

FIG. 1B shows an embodiment of the picture storage system 12 in greater detail. The scanning unit 1 in FIG. 12 comprises a scanning element 170 for scanning the photographic picture capture medium 3 and for conveying the scanned picture information into customary information signals, for example, RGB picture signals, representing the scanned picture. The picture signals at the output of the scanning element define the highest attainable resolution in number of pixels per picture. The information signals supplied by the scanning element 170 are conveyed into a luminance signal Y and two color-difference signals U and V by means of a customary matrix circuit 171. A coding circuit 172 converts the signals Y, U and V in a customary manner into absolutely coded signals (for the lower-resolution pictures) and residually coded signals (for the higher-resolution pictures) in accordance with the coding schemes described hereinbefore. The scanning element 170, the matrix circuit 171 and the coding circuit 172 are controlled by means of a customary control circuit 174 on the basis of control commands applied to the control circuit 174 by the control unit 4 via an interface circuit 175. The absolutely and residually coded picture information generated by the coding circuit 172 is applied to the control unit 4 via the interface circuit 175. The control unit 4 may comprise a computer system having a display unit 176, a computing and storage unit 177 and a data entry unit 178, for example, a keyboard, for data input by the user. In a customary manner, the display unit 176 and the data entry unit 178 are coupled to the computing and storage unit 177. The computing and storage unit 177 is further coupled to the picture scanning unit 1 and the recording unit 5 via an interface circuit 179 and 180, respectively. The recording unit 5 comprises a formatting and coding unit 181 which converts the information to be recorded, this information being received from the control unit via an interface circuit 182, into codes which are suitable for recording and which are arranged in a format suitable for recording. The data which has thus been coded and formatted is applied to a write head 183, which records a corresponding information pattern on the record carrier 184. The recording process is controlled by a control circuit 185 on the basis of the control commands received from the control unit 4 and, if applicable, address information indicating the position of the write head 183 relative to the record carrier 184.

The storage and control unit 177 is loaded with suitable software to arrange the residually coded digitized picture information supplied by the scanning unit 1 in a customary manner in accordance with the afore-mentioned formatting rules and to compose the picture files IP and OV. Moreover, the computing and storage unit 177 has been loaded with software for inserting in the control file, in a customary manner and in accordance with the afore-mentioned formatting rules, the picture parameter data input by an operator together with other automatically generated control data, such as, for example, a list of addresses at which the various files have been recorded on the record carrier 184.

The computing and storage unit 177 may further have picture processing software enabling the scanned picture information to be processed, for example, for the purpose of error correction, such as, for example, out-of-focus correction and grain removal, or for the purpose of color adaptation or brightness adaptation of the picture.

The files composed by means of the computing and storage unit 177 are applied to the recording unit 5 in the desired sequence in order to be recorded.

Very suitable combinations of a record carrier 184 and a recording unit 5 have been described in detail inter alia in European Patent Applications no. 88203019.0, corresponding to U.S. Pat. No. 5,001,035, 90201309.3, 8900092.8, corresponding to U.S. Pat. No. 4,901,300, 8802233.8, corresponding to U.S. Pat. No. 4,979,168, 8901206.3, corresponding to U.S. Pat. No. 5,060,219, 90201094.1, corresponding to U.S. Pat. No. 5,226,027, 90201582.5, corresponding to U.S. Pat. No. 5,303,217, 90200687.3, 90201579.1 corresponding to U.S. Pat. No. 5,072,435 and Dutch Patent Applications no. 8902358, corresponding to U.S. Pat. No. 5,428,598 and 9000327. The record carrier described therein is eminently suited for recording information in accordance with a CD format. A recording device for recording the files on such record carrier is shown diagrammatically in FIG. 13. The shown recording device comprises a formatting circuit 186, which composes the information to be recorded, which has been applied via the interface circuit 182, in accordance with a formatting scheme, for example, as customary in the so-called CD-ROM or CD-ROM XA system.

Figure 13:
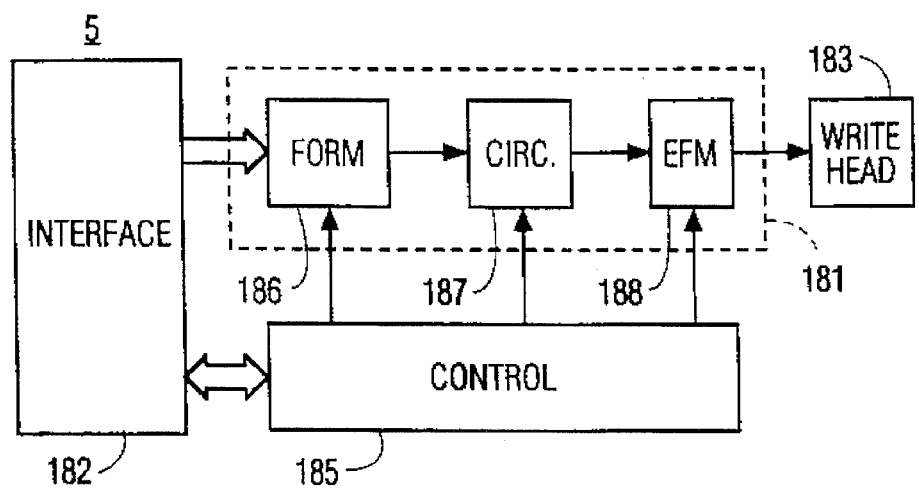
FIG. 13 shows a recording unit for use in the picture storage system.
Figure 14:
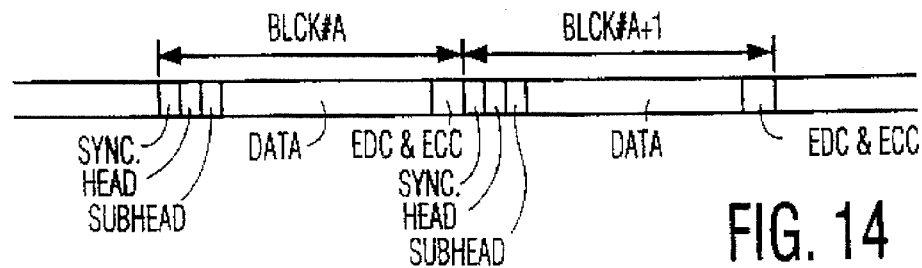
FIG. 14 diagrammatically illustrates the CD-ROM XA format.

By way of illustration, this format is shown broadly in FIG. 14. In accordance with this format, the data is arranged in blocks BLCK of a length corresponding to the length of a subcode frame in the CD signal. Each block BLCK comprises a block synchronizing section SYNC, a header section HEAD containing an address in the form of an absolute time code corresponding to the absolute time code in the subcode portion recorded with the block, and, if the CD-ROM XA format is used, the block BLCK further comprises a subheader section SUBHEAD containing, inter alia, a file number and a channel number. In addition, each block BLCK comprises a DATA section containing the information to be recorded. Each block BLCK may also comprise a section EDC&ECC containing redundant information for the purpose of error detection and error corrections. The recording unit 5 shown in FIG. 13 further comprises a CIRC coding circuit 187 for interleaving the information and for adding parity codes for the purpose of error detection and error correction (hereinafter also referred to as error correction codes). The CIRC encoding circuit 187 performs the above-mentioned operations upon the formatted information supplied by the formatting circuit 186. After these operations have been performed, the information is applied to an EFM modulator 188, in which the information is given a form which lends itself better for recording on the record carrier. Moreover, the EFM modulator 188 adds subcode information, which includes, inter alia, an absolute time code as address information in the so-called subcode Q channel.

Figure 15:
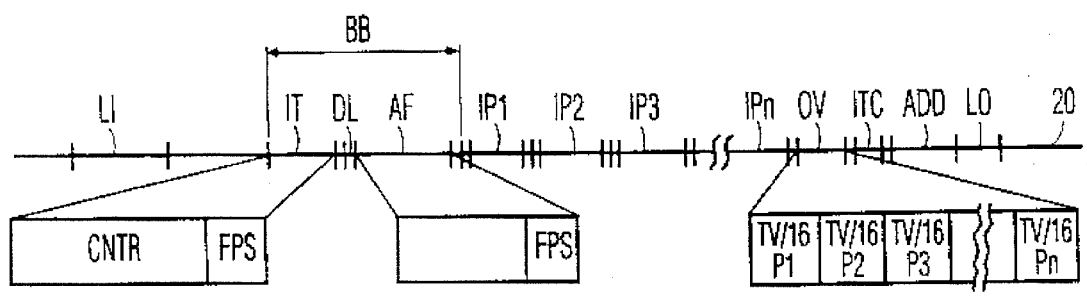
FIG. 15 shows a suitable organisation of the record carrier if the picture information has been recorded in accordance with a CD-I format.

FIG. 15 shows an organization of the record carrier in the case that the information has been recorded in the track 20 in accordance with the CD format described above. Parts corresponding to the organization shown in FIG. 2 bear the same reference numerals.

The recorded information is preceded by a lead-in section LI (also referred to lead-in track), as customary in the recording of CD signals, and is terminated with a customary lead-out section LO (also referred to as lead-out track).

When the information is recorded in CD format, it is preferred to include in the control file BB a section recorded in accordance with the CD-I standard. These sections are the "Disk Label & Directory", referenced DL, and the so-called application programs, referenced AF. This enables the recorded picture information to be displayed by means of a standard CD-I system. Preferably, a sub file FPS with the sets of picture parameter data is also included in the application program section AF. In addition to the sections DL and AT, the control file BB comprises a subfile IT comprising a section CNTR with control data and a section FPS with the sets of picture parameter data. Preferably, the section IT is recorded in a predetermined area, also known as the "pregap" on the record career in a section of predetermined length. This is in order to simplify retrieval of the required information by the microcomputer. Further recording in the pregap has the advantage that the format meets the CD-I format requirements. If the section IT is not large enough to accommodate all the control data, a part of the control data can be recorded in a section ITC after the file OV. In that case, it is preferred to include a pointer in the section IT to specify the starting address of ITC.

Figure 16:
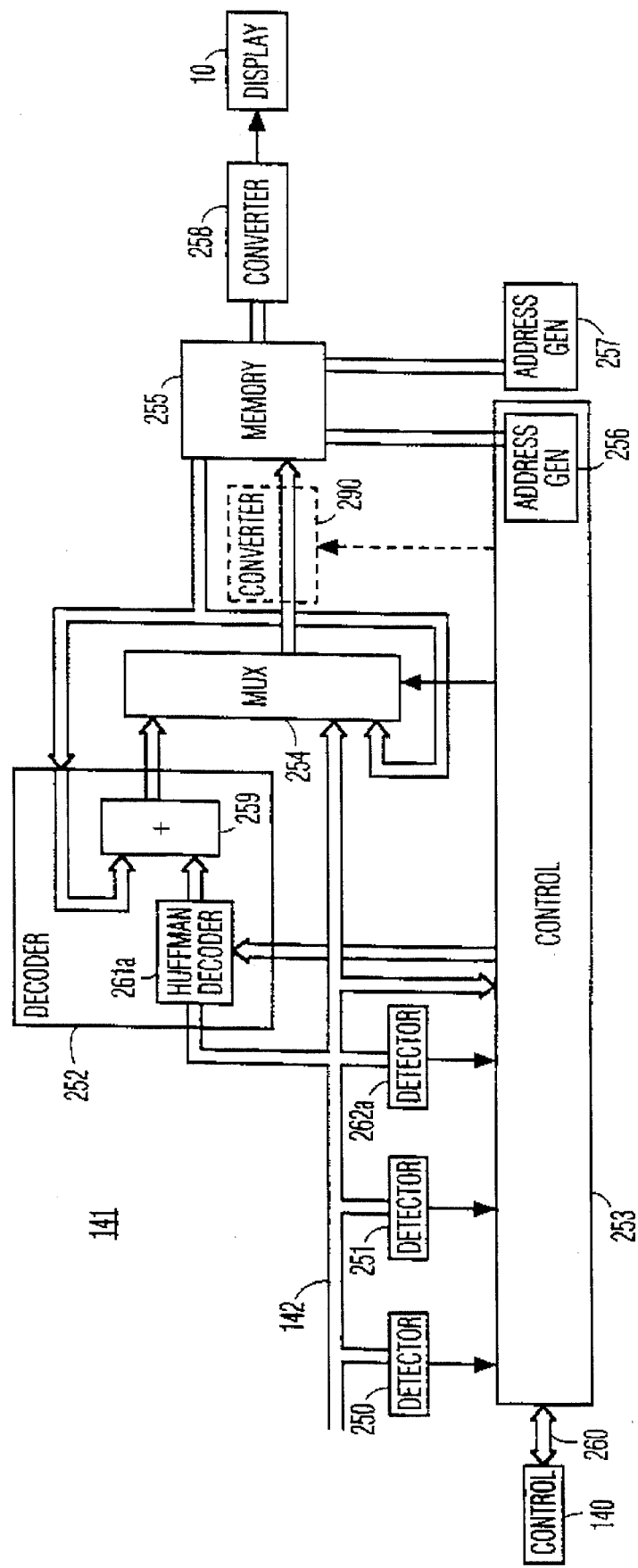
FIG. 16 shows an example of a picture processing unit.

FIG. 16 shows the picture processing unit 141 in greater detail. The picture processing unit 141 comprises a first detection circuit 250 for detecting synchronization codes LD and picture line numbers LN indicating the beginning of each residually coded picture line. A second detection circuit 251 serves for detecting the beginning of each subfile in each picture file with a residually coded picture to indicate the beginning of the section IIDB containing the addresses of a number of digitizing picture lines. It is to be noted that the detection circuits 250 and 251 are needed only for processing the residually coded pictures and not for processing absolutely coded pictures. For the purpose of these detections, inputs of the first and the second detection circuit 250 and 251 are connected to the signal path 142. A decoding circuit 252 for decoding the residually coded picture information and a control circuit 253 for controlling the picture processing operation are connected to the signal path 142. The signal path 142 and outputs of the decoding circuit 252 are connected to data inputs of a picture memory 255 via a multiplex circuit 254, to store the read and decoded picture information. Dam outputs of the picture memory 255 are connected to the inputs of the decoding circuit 252 and to the inputs of the multiplex circuit 254. The control circuit 253 comprises an address generator 256 for addressing the memory locations in the picture memory 255. The picture processing unit 141 further comprises a second address generator 257 for addressing the memory locations in order to output the content of the picture memory to a signal converter 258. The signal converter 258 is of a customary type which converts the picture information read from the picture memory 255 into a form suitable for application to the picture display unit 10. The decoding circuit 252 may comprise, for example, a Huffman decoding circuit 261*a* controlled by the control unit 253 and an adder circuit 259. The Huffman decoding circuit 261*a* decodes the information received via the signal path 142 and subsequently supplies this decoded information to one of the inputs of the adder circuit 259. Another input of the adder circuit 259 is connected to the data outputs of the picture memory 255. The result of the adding operation performed by the adder circuit 259 is applied to the multiplex circuit 254. The control circuit 253 is coupled to the control unit 140 via a control signal path 260. The control circuit 253 may comprise, for example, a programmable control and computing unit. Such a control and computing unit may comprise, for example, a dedicated hardware unit or a microprocessor system loaded with suitable control software, by means of which, on the basis of control commands received via the control signal path 260, the address generator 256 and the multiplex circuit 254 are controlled in such a way that a selected portion of the picture information applied via the signal path 142 is loaded into the picture memory. The information thus stored in the picture memory 255 is read with the aid of an address generator 257 and is subsequently applied to the display unit 10 via the signal converter 258 in order to be displayed.

Figure 17:
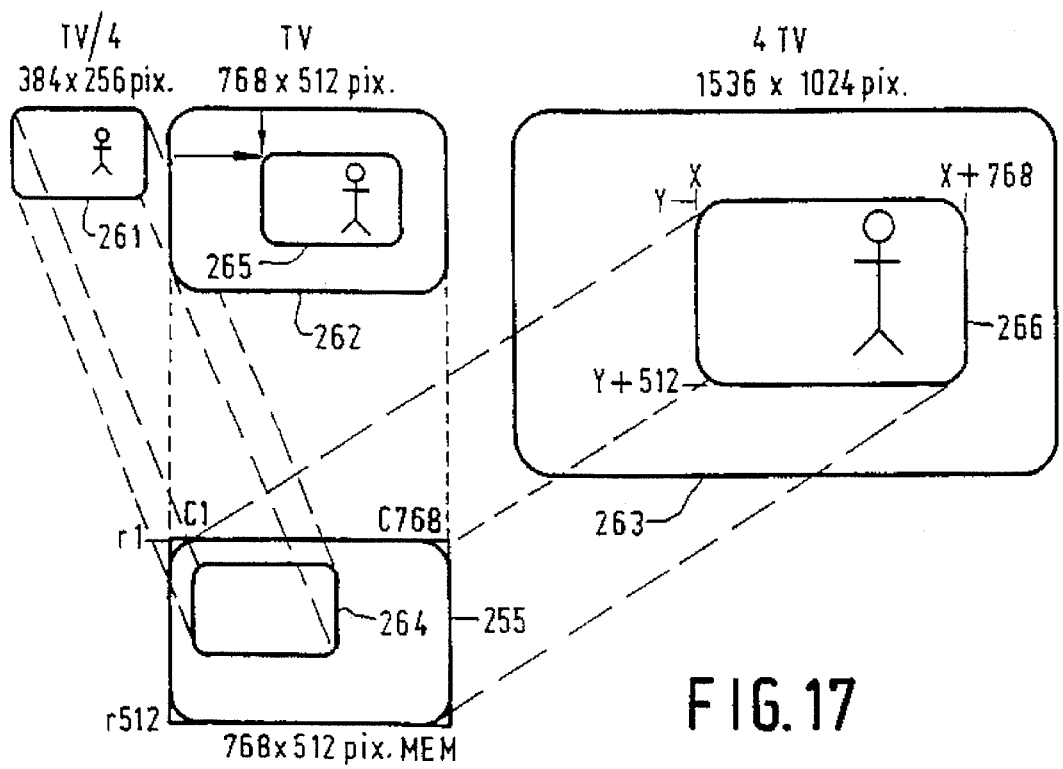
FIGS. 17 and 18 illustrate picture processing functions to be performed by the picture processing unit.

In FIG. 17 the reference numerals 261, 262, 263 denote picture representations of the same picture but with different resolutions. The representation 261 comprises 256 picture lines of 384 pixels each. The representation 262 comprises 512 picture lines of 768 pixels each, and the representation 263 comprises 1024 picture lines of 1536 pixels each. The digitized pictures corresponding to the representations 261, 262 and 263 are included in consecutive subfiles TV/4, TV and 4TV of a picture file IP. The capacity of the picture memory 255 shown in FIG. 17 is 512 rows of at least 768 memory locations (also called memory elements). If a representation should represent the entire coded picture, that sub file is selected from the picture file IP, whose number of pixels corresponds to the capacity of the picture memory, which in the present case is the sub file defining the representation 262. This selection can be made on the basis of the setting data, such as picture numbers and resolution order (this is the identification of the subfile resolution), which are stored at the beginning of each subfile in, for example, the header HEAD and the subheader SUBHEAD of the blocks BLCK. For each subfile, this data is read in by the control circuit 253 in response to a signal supplied by a block synchronization detector 262a upon detection of the beginning of each block BLCK.

In the case that a representation of an absolutely coded picture is to be reproduced, upon detection of the beginning of the subfile to be selected, the control circuit sets the multiplex circuit 254 to a state in which the signal path 142 is connected to the data inputs of the picture memory 255. Moreover, the address generator 256 is set to a state in which the memory locations are addressed in synchronism with the reception of the successive pixel information, in such a way that the information for the picture lines 11, . . . , 1512 is stored in the respective rows r1, . . . , r512 of the memory 255. The picture information thus loaded into the memory 255 is read out and is converted into a form suitable for the display unit 10 by means of the signal converter 258. The read-out sequence is determined by the sequence in which the address generator 257 generates the successive addresses. During normal reproduction, this sequence is such that the memory is read in a row-by-row fashion, starting with the row r1 and starting with column c1 within a row. This is possible both in accordance with the interlaced-scan principle and the progressive-scan principle. In the case of read-out according to the interlaced-scan principle, all the odd rows of the picture memory 255 are read first and subsequently all the even rows of the picture memory 255 are read. In the case of read-out in accordance with the progressive-scan principle, all the rows are read in sequence. A very attractive alternative for the method of storing the picture information in the picture memory 255 is that in which the picture memory 255 is first filled with picture information from a picture file defining a lower-resolution representation of a picture and subsequently the content of the memory is overwritten with a coded picture defining a higher-resolution representation of the same picture. In the above example, this is possible in that during read-out of, each coded pixel from the subfile TV/4 each of a group of 2×2 memory elements is each time filled with the signal value defined by this coded pixel. This method is known as the "spatial replica" method. A better picture quality is obtained by filling only one of the memory elements of the 2×2 matrix with the signal value defined by a read-out pixel, and by deriving the other pixels of the 2×2 matrix from adjacent pixels by means of known interpolation techniques. This method is known as the "spatial interpolation" method. After detection of the next subfile (in the present case TV), the content of the picture memory is, each time, overwritten with the picture information of this sub file in the methods described above. The amount of information in the sub file TV/4 is only a quarter of that in the subfile TV. This results in a substantial reduction of the time after which a first provisional picture is displayed on the display unit. After read-out of the picture file TV/4, this low-resolution picture is overwritten with a representation of the same picture having the desired resolution. As the picture files with coded pictures of successive resolutions succeed one another directly, no time is lost in searching for the subfile TV after read-out of the subfile TV/4.

Figure 18:
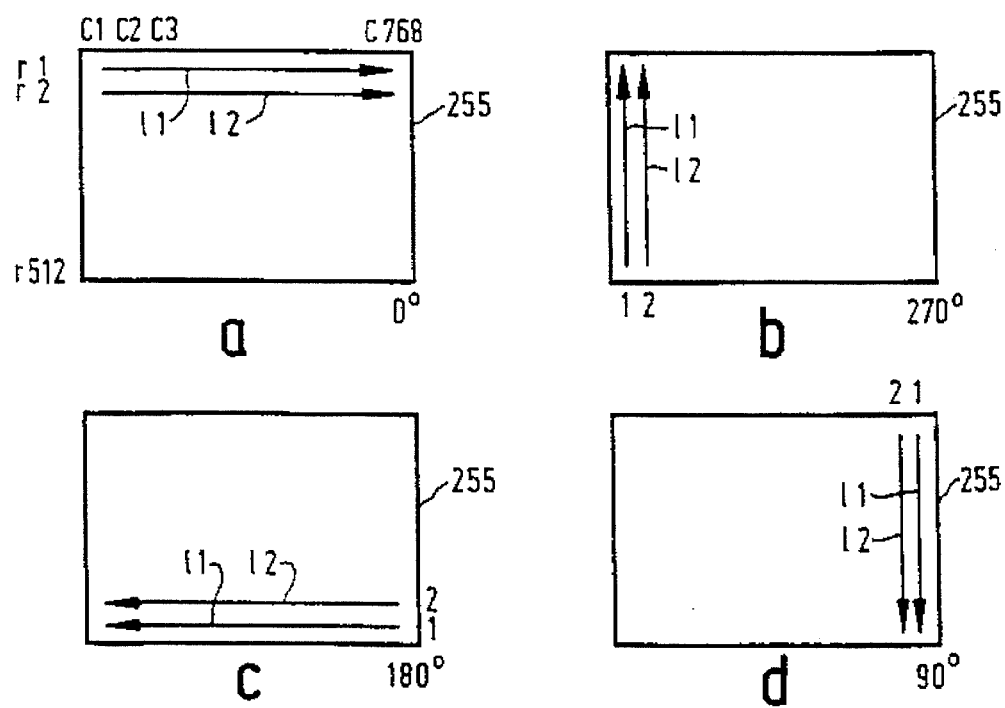

In the case that a picture is to be rotated, the address generator 256 is set to a state in which the sequence of addressing the memory locations is adapted in accordance with the desired rotation angle. FIGS. 18b, 18c and 18d illustrate how the picture information is stored in the memory for a rotation through an angle of 270, 180 and 90 degrees, respectively. For the sake of clarity, these Figures only show the positions of the information of the first two picture lines 11 and 12 of the picture.

In the case that a representation of a small picture is to be displayed within the outline of a full-scan representation of another picture or, if desired, the same picture (PIP function), this can be achieved simply by filling the desired location of the picture memory 255 with the low-resolution picture of the sub file TV/4 without magnification. When the picture memory 255 is filled, the address generator 256 is then set to a state in which the information for memory locations is addressed in which the small picture is to be stored. To illustrate this, these memory locations are represented as a frame 264 in FIG. 17. During the picture processing described above, the presence of the low-resolution picture in the subfile TV/4 again has the advantage that the picture : information required to perform this function is directly available in the picture file IP, so that additional processing is not necessary.

When an enlarged representation of a pan of the absolutely digitized picture is to be displayed, the information of a pan of the picture, for example, the part corresponding to a frame 265, is selected. The information of each pixel of the selected part is loaded into every memory location of a group of 2×2 memory locations, so that a magnified full-scan representation of low resolution is displayed on the display unit. Instead of repeating each pixel 2×2 times in the memory, the memory may be filled in accordance with the spatial-interpolation principle mentioned in the foregoing.

In order to magnify the residually coded pictures, the above step is performed first. Subsequently, the part represented by the frame 266 is selected in the subfile 4TV. The part in the frame 266 corresponds to the part within the frame 265 in the representation 262. The control circuit 253 sets the multiplex circuit 254 to a state in which the output of the residual decoding circuit 252 is connected to the data inputs of the memory 255. The address generator 256 is set to a state in which it addresses the picture memory 255 in synchronism with the received coded pixels, in the sequence in which the residually coded digitized picture information from the subfile 4TV becomes available. The picture information in the addressed memory locations is applied to the decoding circuit 252 and, by means of the adder circuit 259, it is added to the residual value, after which the information thus adapted is loaded into the addressed memory location. The part of the picture information recorded on the record carrier corresponding to the frame 266 is preferably read on the basis of the information in the control file IIDB. The information in the section IIDB is read in by the control circuit 253 in response to a signal from the detector 250. Subsequently, the address of that digitized picture line is selected from this information which is situated shortly before the first digitized picture line corresponding to the picture line in the frame 266. After this, the control circuit supplies a command to the control unit 140 via the control signal path 260, this control unit, in response to this command, initiating a search process in which the part with the selected digitized picture line is located. When this part is found, the read-out of the picture information is started and the adaptation of the content of the memory 255 is started as soon as the part of the first digitized picture line which corresponds to the part of the picture within the frame 266 is reached. The detection of this digitized picture line is effected on the basis of the line numbers which, together with the line synchronization codes LD, have been inserted at the beginning of each digitized picture line. The control circuit reads in these line numbers LN in response to a signal from the detector circuit 25 i. The storage of the address information at the beginning of the sub file 4TV enables a rapid access to the desired information to be obtained. The detection of the read-out of the desired residually digitized picture lines is simplified by the presence of the line synchronization cedes and line numbers in the subfile 4TV.

Figure 19:
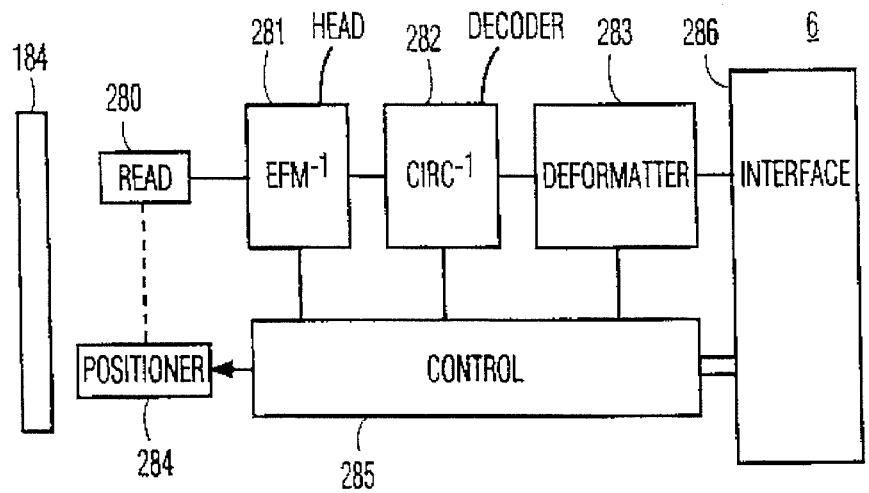
FIG. 19 shows an embodiment of a read device.
Figure 20:
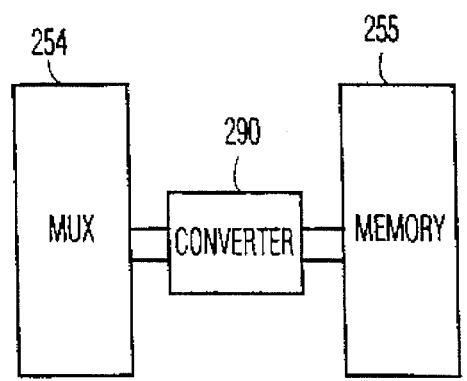
FIG. 20 diagrammatically illustrates the use of a sample rate converter in a simplified picture processing unit.

FIG. 19 shows an embodiment of the read unit 6 by means of which it is possible to read out the coded picture information recorded on the record carrier by means of the recording unit shown in FIG. 13. The shown read unit 6 comprises a customary read head 280 which reads the information patterns on the record carrier 184 by scanning the track 20 and converts the resulting information into corresponding signals. The read unit further comprises a customary positioning unit 284 for moving the read head 280 in a direction transverse to the tracks to a portion of the track 20 specified by a selected address. The movement of the read head 283 is controlled by a control unit 285. The signals convened by the read head 280 are decoded by an EFM decoding circuit 281 and are subsequently applied to a CIRC decoding circuit 282. The CIRC decoding circuit 282 is of a customary type, which restores the original structure of the information which has been interleaved prior to recording and which detects and, if possible, corrects incorrectly read codes. Upon detection of incorrigible errors, the CIRC decoding unit supplies a new error flag signal. The information which has been restored and corrected by the CIRC decoding circuit 282 is applied to a deformatting circuit 283 which removes the additional information added by the formatting circuit 186 prior to recording. The EFM demodulating circuit 281, the CIRC decoding circuit 282, and the deformatting circuit 283 are controlled in a customary manner by the control unit 285. The information supplied by the deformatting circuit 283 is applied via an interface circuit 286. The deformatting circuit may comprise an error correction circuit by means of which errors which cannot be corrected by the CIRC decoding circuit can be detected and corrected. This is effected by means of redundant information EDC & ECC added by the formatting circuit 166. The error correction circuit, which is comparatively complex and therefore comparatively expensive, is not necessary. This is because the effects of erroneously read codes in the absolutely coded picture information can be masked simply by replacing the incorrectly read coded pixels and/or a complete coded picture line by picture information derived from one or more adjacent coded pixels or adjacent coded picture lines. Such a correction can be effected simply by means of the signal processing unit 141 shown in FIG. 16, by programming the control circuit 253 so as to be responsive to the error flag signal supplied by the CIRC decoding circuit 282 to control the address generator 256 in such a way that the information of an adjacent pixel is read and, at the same time, the multiplex circuit 254, is set to a state in which the data outputs of the picture memory 255 are connected to the data inputs. Subsequently, the address generator is reset to its previous state and, instead of the incorrectly read coded pixel, the information read from the picture memory 255 is stored at the addressed memory location.

In the case that a residually coded picture is read, the value in the memory 255 to is not adapted upon detection of an incorrectly read residual value but remains unchanged. This can be achieved, for example, by causing the control circuit to generate a signal which inhibits writing into the memory 255 when the erroneous residual value is applied.

The capacity of the picture memory 255 is large, so that the cost price of such a memory is comparatively high. The memory capacity may be reduced by arranging between the multiplexer 254 and the picture memory 255, a sample rate converter 290 of a customary type, which reduces the number of pixels per line from 786 to 512.

With reference to FIG. 21–27 now further embodiments of the apparatus and method will be described.

Figure 21:
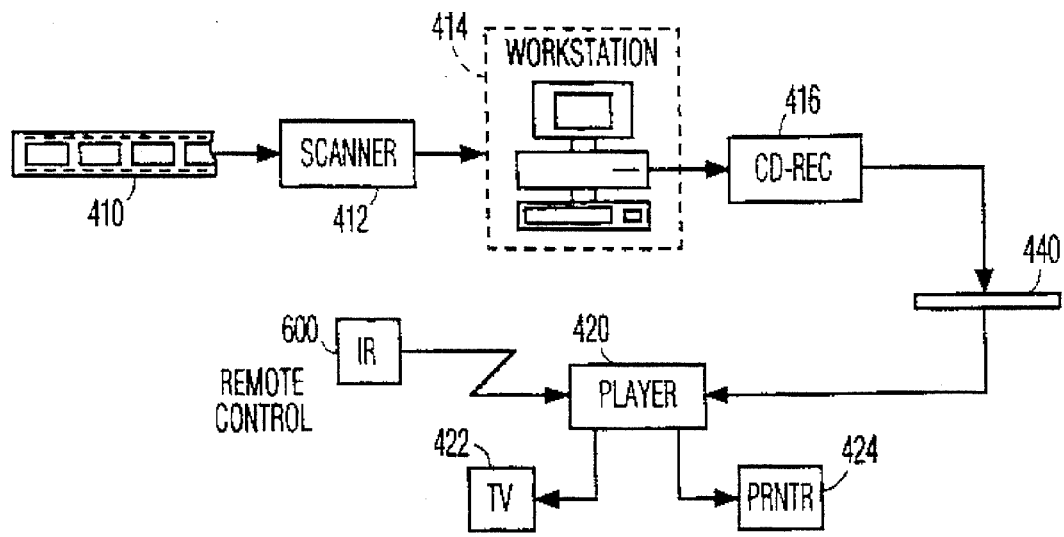
FIG. 21 diagrammatically illustrates a photographic color film processing system in which the present invention may be employed.

FIG. 21 diagrammatically illustrates a photographic color film processing system (photofinishing minilab) with which the present invention may be employed.

In accordance with the digital picture processing system of FIG. 21, photographic pictures, such as a set of twenty-four or thirty-six 36 mm×24 mm picture flames of a 35 mm film strip 410, are scanned by a high resolution opto-electronic film scanner 412, such as a commercially available Eikonix Model 1435 scanner. High resolution scanner 12 outputs digitally encoded data (e.g., a 3072×2048 pixel matrix) representative of the interval electronic scanning of a high resolution picture sensing array onto which a respective photographic picture frame of film strip 10 is projected. This digitally encoded data (digitized picture) is coupled, in the form of a pixel array-representative bit map, to an attendant picture processing workstation 414 which contains a frame store and picture processing application software through which the digitized picture may be processed (e.g., enlarged, cropped, subjected to a scene balance correction, etc.) to achieve a desired picture appearance. Once a picture file has been prepared, it is stored on a transportable data base medium, such as a write-once optical compact disc, using compact disc recorder 416. The disc may then be inserted into a compact disc player 420 and, via the operation of selector switches of a cabinet-resident control panel or (I) remote control unit 600, a selected picture file is accessed for display on the user's television set 422. The CD player may also drive a high resolution thermal printer 424 for obtaining a hard copy of a selected picture.

In accordance with the picture processing system as described hereinbefore each digitized high resolution picture is stored as a respective picture file containing a low, (or base) resolution absolute coded pictures, and a plurality of higher resolution residual coded pictures associated with respectively increasing degrees of picture resolution. By iteratively combining the higher resolution residual digitized pictures data with the low resolution absolute digitized pictures, successively increased resolution pictures may be recovered from the base resolution picture.

As an example, spatial data values representative of a high resolution (3072×2048) picture scan of a 36 mm -by-24 mm picture frame of a 35 mm film strip 10 may be stored as a respective picture file including a base resolution digitized picture, containing data values associated with a spatial picture array of 512 rows and 768 columns of pixels, and an associated set of residual coded pictures, to be stored on the disc. Within the workstation itself, the base resolution digitized picture may be further sub-sampled to derive an even lower resolution sub-array of picture values (e.g., on the order of 128×192 pixels) for display on a segment of the system operator's workstation for the purpose of identifying picture orientation and specifying aspect ratio. Preferably, a header file is associated with each picture file for the purpose of specifying how the picture was captured on film and has been correspondingly digitized and stored on disc. The information in the header file is used by the playback device to ensure that the picture will have an upright orientation and the correct aspect ratio for the reproduction device. In addition, a master header file is recorded which includes a unique ID number for each disc recorded by CD recorder 416 in FIG. 21, in order to uniquely identify each disc.

When a film strip is originally scanned in the photoprocessing minilab, each picture is digitized as though it were horizontally oriented, irrespective of its actual orientation on the film. The digitized picture is stored in the workstation's frame store, as is, and a lower resolution representation of the digitized picture is displayed on the display monitor of workstation 14, so that the picture may be viewed by the operator. As each picture is digitized and stored on the disc, the photofinishing minilab operator, using a workstation input device, enters picture parameter data in the form a set of "presentation" control codes that are incorporated within the header file associated with a respective picture file to indicate how the picture has been stored, so that, when subsequently accessed by a reproduction device, the picture will be played back in an upright orientation at the correct aspect ratio.

Figure 22:
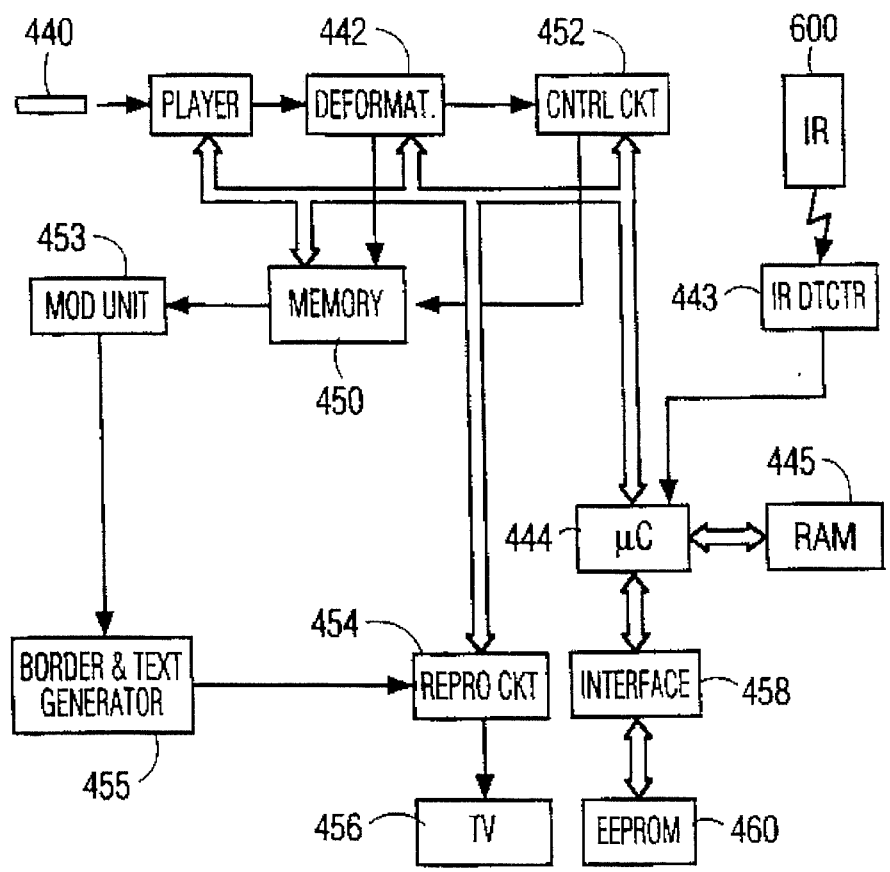
FIG. 22 diagrammatically illustrates the signal processing architecture of a digitized still photographic picture playback apparatus that incorporates an auxiliary removable memory module for storing and retrieving user-customized picture parameter date.

FIG. 22 diagrammatically illustrates the signal processing architecture of a picture retrieval mechanism that has been modified, in accordance with the present invention, to incorporate an auxiliary removable memory module for storing user-customized picture parameter data. The playback device itself is preferably a compact optical disc player, such as a CD-I player which accesses digital picture files that have been stored on disc and supplies video signals to a user's color television monitor. The contents of the picture file read from an optical compact disc 440 are coupled to a deformatter 442, wherein the file is deformated into a digitized picture and its associated header field, under the control of a resident microcontroller 444. The digitized picture is stored in a picture memory 450, while the contents of the header field are coupled to a memory access control circuit 452, which controls how the digitized picture data is transferred from the disc into picture memory 450 and how the contents of the frame store are read out to associated circuitry 454 for driving a color television display 456.

Depending upon the size of picture memory 450, the architecture of the memory access control circuitry may incorporate decimation/interpolation operators to adjust the aspect ratio and size of the picture eventually supplied by the frame store to the television display. In accordance with the improvement provided by the present invention, the user/viewer is able to supply and store customizing picture parameter data independently of preprogrammed picture parameter data on the disc, so that microcontroller 444 will control the presentation of picture data to the display device in accordance with such user-preference inputs. For this purpose, microcontroller 444 is coupled with an interface 458 through which it may write to and read a removably engageable auxiliary digital data base medium, such a memory module 460 e.g. in the form of an electrically erasable programmable read only memory (EEPROM). The form module 460 takes may be any of a variety of currently available EEPROM modules, such as a "smart card" or a magnetic ROM cartridge used in commercial video games and laptop computers. For an illustration of the use and manner of interfacing an EEPROM device, per se, as an auxiliary memory module for augmenting the internal storage capability of a playback device, attention may be directed to the U.S. Pat. No. 4,855,842 to Hayes et al., which describes the interfacing of such a module for a programmed video teaching system, and how such an auxiliary memory module can be used to permit access by one or more specific users (students) and keep track of a student's progress.

In accordance with the present invention, such an auxiliary, transportable, memory module is used for storing user-sourced picture parameter data, such as contrast, picture magnification, color balance, saturation, border type and border location, etc., thereby enabling the user to save, in a removable memory module, parameters that have been input to the microcontroller, as by way of a conventional, hand-held remote control (IR) unit 600. Removable memory module 460 may then be extracted from interface 458 in the playback device and reinserted into that device during a subsequent playback operation or inserted, along with its associated disc, in another playback device for controlling another reproduction unit.

In order to facilitate an understanding of the picture customizing and auxiliary storage mechanism of the present invention, the following discussion will explain both the operation and the data structure used to assemble respective pictures and associated parameter fields that are defined in the course of customizing one or a plurality of pictures.

Figure 27:
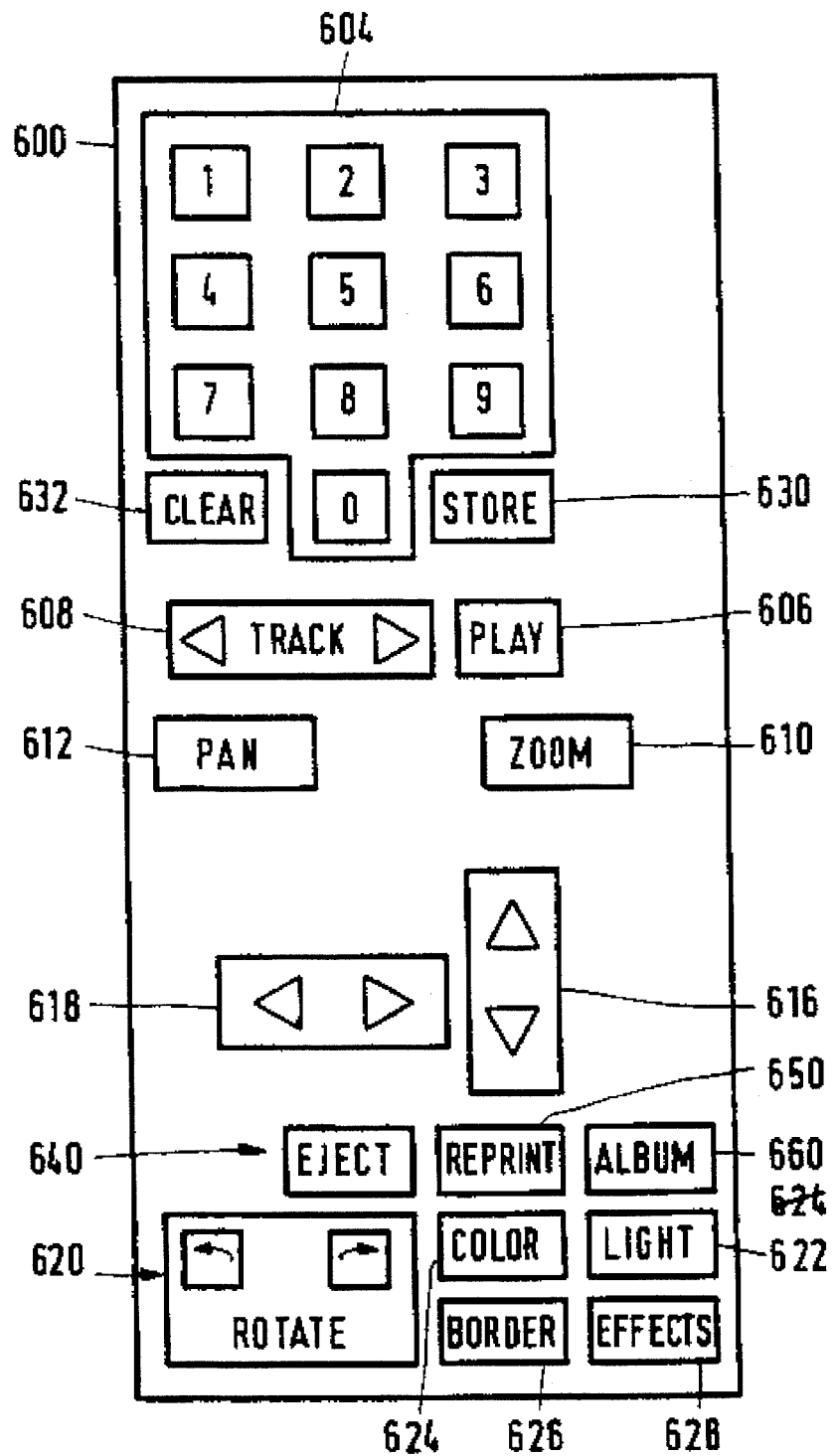
FIG. 27 shows the push-button layout configuration of a user-operated IR remote control unit for operating a CD player.

When an optical compact disc onto which digitized picture files have been recorded is inserted into playback device 420 in FIG. 21, the presentation of picture on NTSC display 422 can be controlled by the user via IR remote control unit 600, which is shown in greater detail in FIG. 27. Individual pictures can be viewed by entering the picture number using buttons 604 and then pressing the play button 606, or by pressing either the track forward or track backwards arrows 608 to move on to the next or back to the previous picture on the disc. As the picture data is read from the disc 640, the preprogrammed picture parameter data is used to control the memory access control circuit 452, so that the correctly oriented picture is read from picture memory 450. However, should the orientation code in the preprogrammed picture parameter data be in error, due, for example, to an operator erroneously programming the presentation control data for the particular picture in the course of recording the picture onto the disc via CD recorder 416 (FIG. 21), then the user may re-orient the picture via rotate buttons 620.

The user may also zoom in or out to display only a portion of the picture in enlarge form by pressing the zoom button 610 followed by either of the up/down arrow keys 616, which instructs the memory control circuit 452 to read out the proper portion of the picture stored in picture memory 450. Further, the user may alter the appearance of any displayed picture by pressing the "lighten" button 622 followed by either the up/down arrows 616, which cause the supply of control codes for increasing or decreasing the contrast of the picture, respectively, or the left/right arrows 618, which increase or decrease the brightness of the picture, respectively, by properly instructing the color and tone modification circuit 453 to alter the brightness or contrast of the digitized picture as desired, via digital lookup tables.

The user may also alter the color of the displayed picture. For this purpose, the user may depress color button 624, followed by either the up/down arrows 616, which cause the generation of control codes to increase or decrease the color saturation of the picture, respectively. Similarly, the user may depress the left/right arrows 618, which alter the color balance of the picture, respectively, by instructing the color and tone modification circuit 453 to alter the saturation or color balance of the digitized picture by means of a digital 3×3 color correction matrix circuit (not shown).

The user may also create a colored border in the picture via color border generator and text generator 455, by first pressing the border button 626 followed by the arrow keys 616 and 618 which allow the border to be properly positioned. The color of the border can be changed by pressing the color button 624 and the border button 626 simultaneously, and then pressing keys 616 to alter the color saturation, or keys 618 to alter the color hue.

Generation and positioning of the colored border may be accomplished by means of the border generator circuitry disclosed in co-pending U.S. patent application Ser. No. 405,816, filed Sep. 11, 1989, entitled "A digital circuit for creating area dependent special effects" by K. A. Parulski, et al., and the disclosure of which is herein incorporated.

Finally, via a color and tone modification circuit of the type described in the above-referenced Parulski et al '816 application for generating "posterized" pictures, the user may also create special effects, by first depressing the effects button 628 followed by the an:or keys 616 and 618, which cycle through a number of available effects, including posterized, false-color, or "negative" pictures, until the user selects a pleasing effect for the current picture. The ease with which the user may access the above-described features may be facilitated by judicious use of on-screen menu overlays supplied by text generator 955. Once picture has been "customized" in the manner described above, it is very desirable for the user to be able to display the picture in the future in exactly the same fashion, instead of having to repeat the customization procedure each time the picture is to be replayed. Thus, it is advantageous to be able to store the data describing the parameters which indicate how the picture has been altered, so that it can be recalled and used subsequently, when the user wishes to display the same picture. Because the system of FIG. 21 uses a write-once optical disc, and because CD player 620 cannot record information onto the optical disc, it is not possible to store this data onto the compact disc 640 of FIG. 22.

Thus, some other method of storing the data is required. While a control data memory may be permanently housed within the CD player, it is preferable that the storage device, such as EEPROM module 460 in FIG. 22, be removable and insertable into one or more other playback units.

In accordance with the present invention, once the user has customized picture in the manner described previously, the store button 630 is depressed, which causes the parameters which define the manner in which the picture has been altered to be temporarily stored in a scratchpad RAM 445. The user may then proceed to display, and optionally alter, any or all of the pictures on the disc, depressing the store button 630 once a preferred picture display is obtained. After all viewing, altering, and storing of pictures on the disc has been completed, the eject button 640 is pressed, which causes the disc to be ejected from the CD player, and also causes data stored in scratchpad RAM 445 to be written into EEPROM memory 460. As a result, the next time the same disc is inserted into any player containing the EEPROM module 460 used during the programming session just described, the customized control data can be read out from EEPROM module 460 into the scratchpad 445, in order to display the pictures in the order programmed earlier and with the same zoom position, color balance, etc.

The user may delete any of the programmed pictures by pressing the clear button 632, so that any new pictures may be customized by advancing to the desired picture optionally altering the appearance of the displayed picture, and then pressing the store button 630. This new control data is again temporarily stored in scratchpad RAM 445 and then written to removable EEPROM module 660 when the disc is ejected, as described above.

Figure 23:
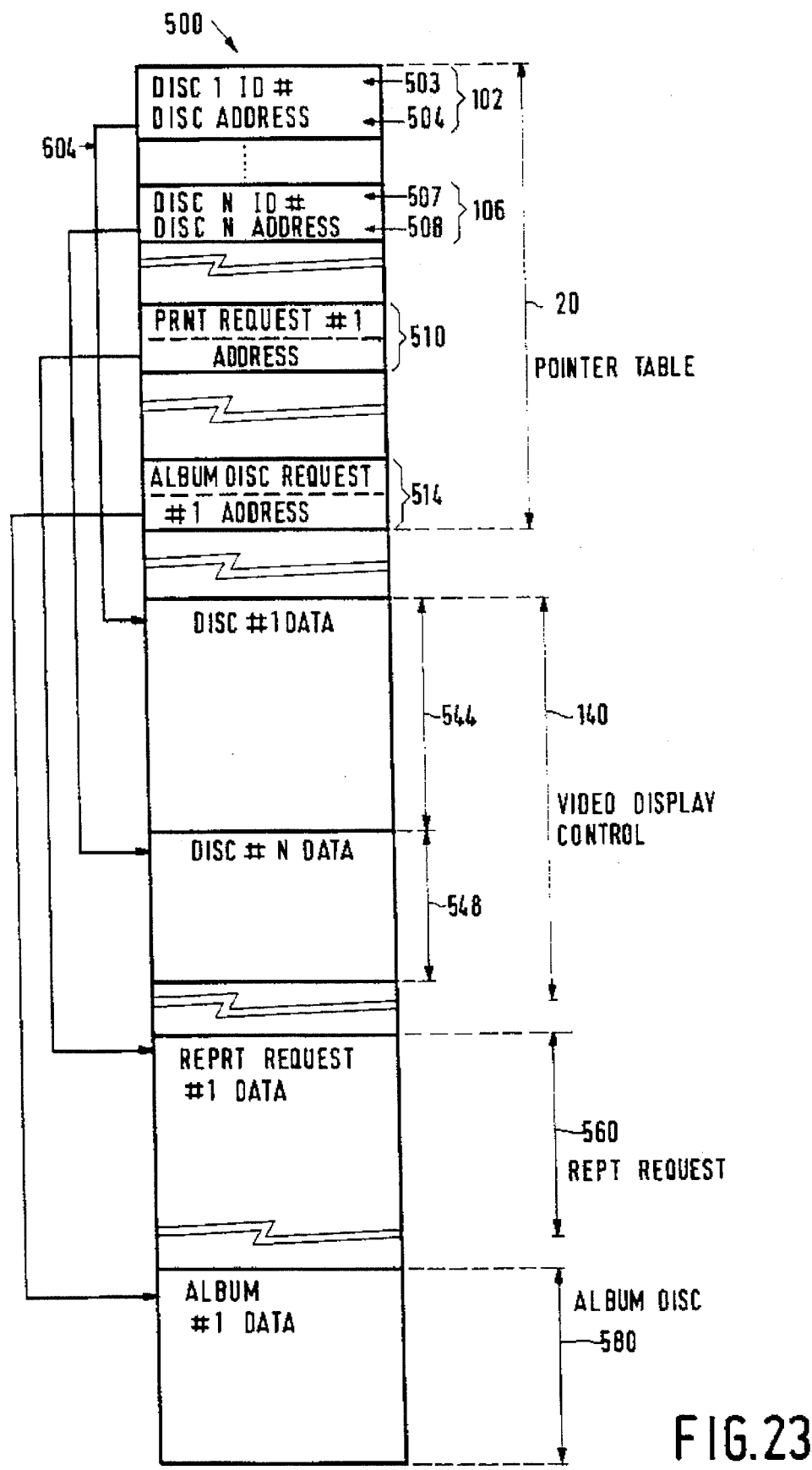
FIG. 23 illustrates the organization of the data stored in an EEPROM module for the storage of parameters which control picture customization.

FIG. 23 illustrates the organization of the data stored in EEPROM module 660 for the storage of parameters which control picture customization as described above. For purposes of providing an illustrative example, the memory organization of FIG. 23 assumes that EEPROM module 460 is a 64K byte memory, which corresponds to a 16-bit address space. The 64K memory is divided into four separate sections, i.e., a pointer table section 520, a video display control data section 540, an optional reprint request data section 560, and an optional album disc data section 580. The lowest addresses are used to store a pointer table 520 which stores a multiplicity of pointer entries of three different types: disc identification (ID) pointer entries, such as disc #1 pointer entry 502 and disc #n pointer entry 560, print request pointer entries, such as print request pointer entry 510, and album disc request pointer entries, such as album disc request pointer 514.

The disc ID pointer entries, such as disc #1 pointer entry 502, are 6 bytes in length and include 2 values, a 4 byte disc ID number, such as disc #1 ID 503, followed by a 2 byte address value, such as disc #1 address 504. Address 504 is the address within EEPROM address space 500 at which the data for the disc having an ID number matching the value stored in location 503 is stored. In other words, the address 504 "points" (as depicted by line 504) to the EEPROM memory location at which the picture parameter data for pictures with disc #1 ID 503 are stored. Similarly, address 508 at which the data for the disc #N having an ID number matching the value stored in location 507 is stored. The pointer table 520 contains disc ID pointer entries for all discs which have been previously inserted into playback device 420 and programmed in a manner to be described below.

When a disc is inserted into a CD player 420, the four byte ID number programmed into the header of each disc is read from the disc 440 (FIG. 2) and the ID number is routed by deformatter 4.42 to microcontroller 444. Microcontroller 444 then searches the pointer table 520 to determine if any of the disc IDs, for example, the IDs stored in location 503 or 507, match the ID number of the disc 540. If there is a match, for example, with the ID value stored in location 507 of EEPROM address spaced 500, the corresponding picture parameter data (video control data) in this exampled disc #N data file 518, is read from EEPROM module 460 into scratchpad RAM 445 via memory modue interface 58 and microcontroller 444.

Figure 24:
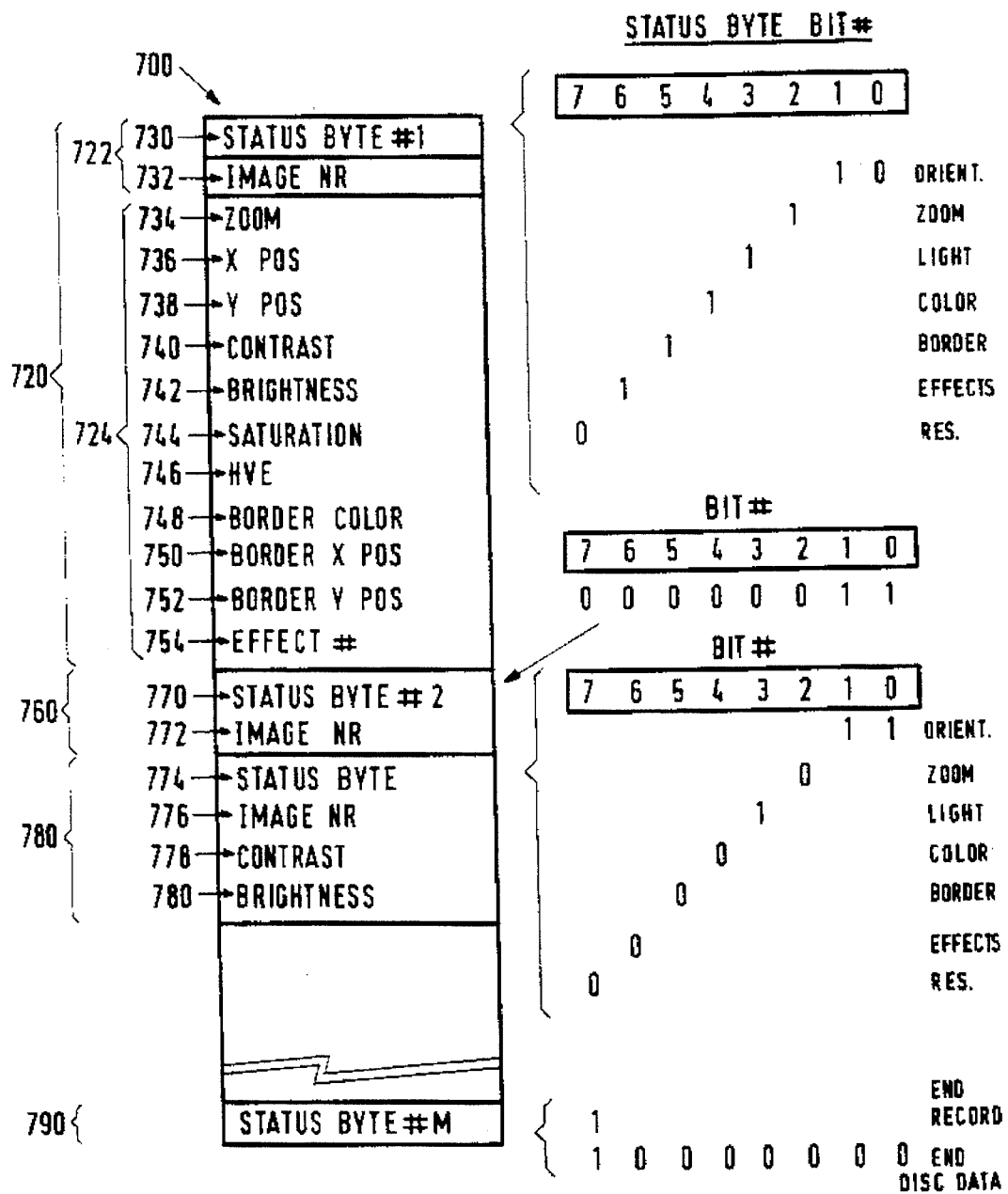
FIG. 24 and 25 illustrates the organization of data in respective disc data files.

The data in each of the individual disc data files, for example, disc #N data file 548, is organized in the manner shown in FIG. 24. The data file 700 is composed of a number of display records, for example display records 720, 760 and 780. Each display record, for example display record 720, is composed of two parts, a i.e., required part 722 including a status byte 730 and a picture number byte 732, and an optional part 724 which depends on the value of status byte 730. The picture byte 732 indicates which picture data record on the disc should be used to create the picture. This allows the pictures on the disc to be played back in any order, and further allows the same picture to be displayed more than once, in two or more different altered forms, so that, for example, different parts of the same picture can be viewed at differing magnifications.

The two LSBs (bit 0 and bit 1) of the status byte 330 are used to stored the orientation of the picture. The next 5 bits (bits 2–26) of status byte 730 indicate which, if any, optional features have been used to alter the picture. In particular, bit 2=1 indicates that the zoom feature was used. When bit 2=1, three one byte parameter values are stored following the picture number byte, the first byte 734 indicating the zoom value (magnification), the second byte 736 indicating the relative position of the left edge of the zoomed area in the x direction relative to the left edge of the original picture, and the third byte 338 indicating the relative position of the top edge of the zoomed area in the y direction relative to the top edge of the original picture. If, on the other hand, bit 2=0, the zoom feature was not used to alter the picture, and the three one byte parameter values are not stored, thus reducing the amount of memory required.

In a similar manner, bit 3=1 indicates that the contrast byte 740 and the brightness byte 742 are present, while bit 3=0 indicates that this feature was not used to alter the picture. Color change are indicated with bit 4=1 along with saturation byte 744 and hue value byte 746. Bit 5=1 indicates that the border feature was used and that border color byte 748, border X position 750, and border Y position 752 are present. Bit 6=1 indicates that the effects feature was also used, and that the effects byte 754 will be present.

Note that for display recorder 370, on the other hand, none of the optional features was used to alter the appearance of the picture, except perhaps the orientation feature. Status bits 2–7 all are set to 0, indicating that the picture number stored in EEPROM address 772 should be displayed with the default settings for zoom, light, color, and border, and without special effects. For display record '780, only the "lighten" 622 button was used to alter the appearance of the picture, so that bit 3=1, and the contrast and brightness parameters are stored. Record 790, where bit 7=1, indicates that the end of discodata file 700 has been reached.

The removable EEPROM module 460 shown in FIG. 22 can also be programmed to order one-or more reprints from a photo finisher equipped with the thermal printer 424 and CD player 420 (FIG. 1) which incorporates the memory module interface 458 of FIG. 22. The disc or disc containing the digitized picture, together with EEPROM module 460, are delivered to the photofinisher, who can automatically generate the desired pictures in their desired form, by reading the reprint request data 560 (FIG. 23).

Figure 25:
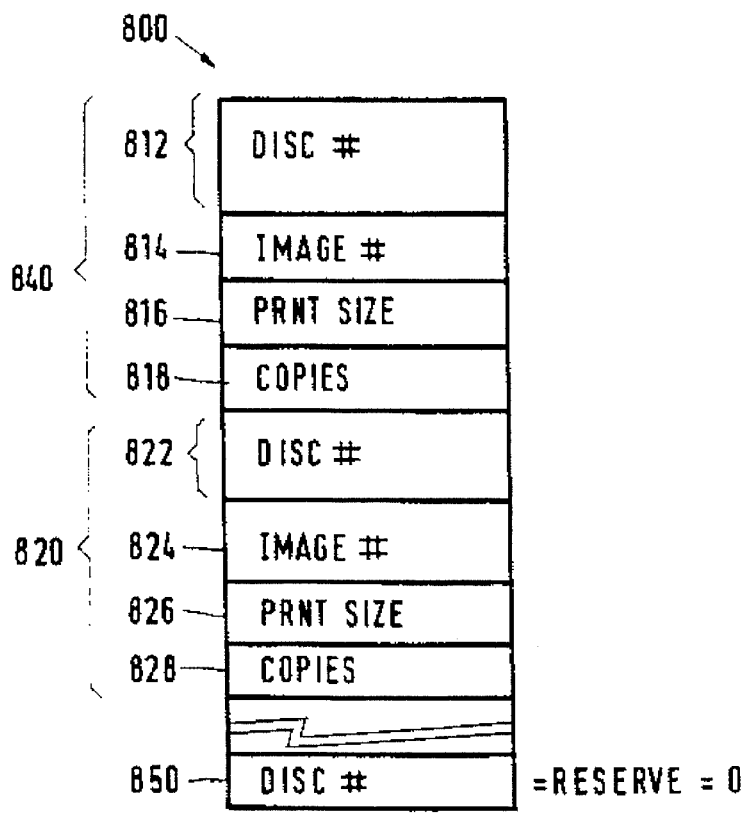

The organization of file 560 is shown in greater detail in FIG. 25. File 560 contains a number of print recorders, for example, 810 and 820, each of which is composed of four values, a four byte disc number 812, a one byte picture number 814, a one byte print size parameter 816, and a one byte copies value 818. The user programs the reprint request data file 800 by locating a desired picture and pressing the reprint button 620 of remote control unit 600. The uses next pusher up/down arrow button 616 to select the desired print size, enters the number of copies desired using buttons 604, and finally pushes the store button 630. After all the desired picture prints have been selected and stored, the disc is ejected and the reprint request data is written from scratchpad RAM 445 to EEPROM module 460, followed by the "reserved word" disc number=0, indicating the end of the reprint request data. When the EEPROM module and discs are supplied to the photofinisher, the reprint request data file may be used to automatically determine the size and number of reprints, and the disc data file used to automatically select any optional features such as zoom, color balance, effects, etc. stored by the user.

Figure 26:
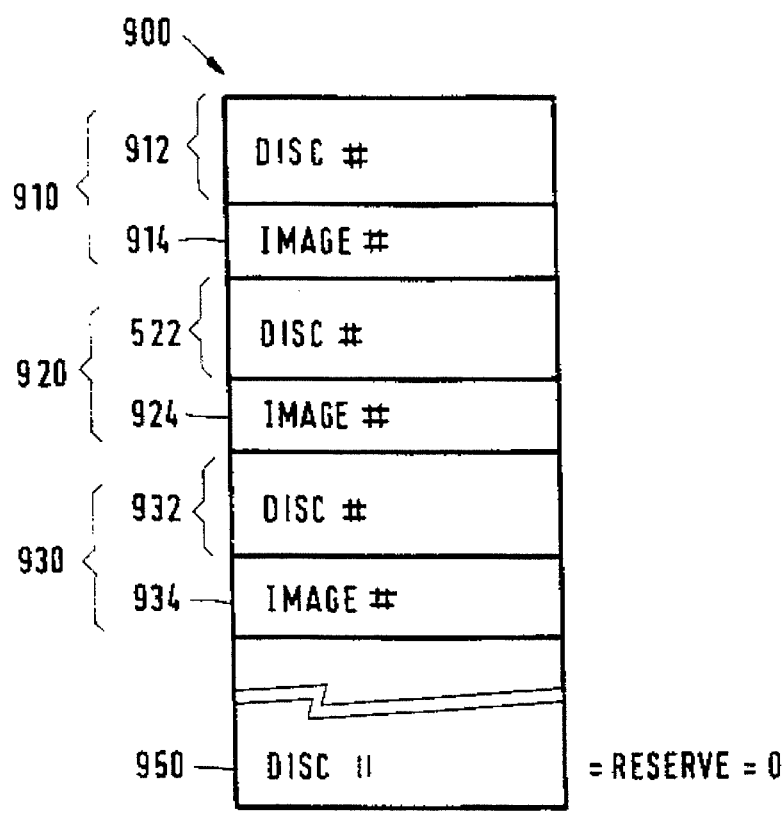
FIG. 26 shows a removable EEPROM module programmed to produce one or more "album" picture discs.

The removable EEPROM module 660 in FIG. 26 can also be programmed to produce one or more "album" picture discs from a photofinisher equipped with the CD recorder 16 and playback device 420 of FIG. 21, which incorporates a memory module interface 458 of FIG. 22. The disc or discs containing the digitized pictures, and the EEPROM module 60 are supplied to the photofinisher, who may automatically record the desired pictures in the desired order onto the new album disc, by reading the album disc data 580 in FIG. 23.

The organization of file 580 is also shown in greater detail in FIG. 15. File 580 file contains a number of album order records, for example, 910, 920 and 930, each of which is composed of two values, a four byte disc number 912, and a one byte picture number 914. The user programs the album disc data file 800 by locating the desired pictures, one at a time and in the desired order, and pressing the album button 660 followed by the stored button 630 on remote control unit 200. When the EEPROM module and discs are given to the photofinisher, the album disc data file is used to automatically decide the order of transferred pictures, and the appropriate disc data files are also written into the master header file of the new album disc, where they may be used to automatically present the pictures on the album disc using the desired optional features such as zoom, color balance, effects, etc., originally stored by the user in the disc data files of the EEPROM module.

As will be appreciated from the foregoing description, the limited ability of an internal memory in a CD player to store user-generated picture parameter data is augmented in accordance with the present embodiment of the invention by incorporating a storage medium, such as an electrically programmable read only memory module, configured to be removably interfaced with the CD player's microcontroller for storing picture parameter data that has been (remotely) programmed by the user. The module can be then removed from the playback device and inserted into that or another playback device for controlling its operation. The customized picture parameter data may include one or more picture reproduction parameters including contrast, picture magnification, color balance, saturation, border type and border location. It may also store information from which a photofinisher may produce hard copy prints of selected pictures or an entirely new album disc of user selections taken from multiple discs. When creating a new album disc, the customized picture parameter data may be recorded from the memory module into the master header file on the new discs, so that the EEPROM module containing the customized picture parameter data does not need to be replicated.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

I claim:

1. A digitized picture playback apparatus for retrieving pictures from a digital data base medium in which digitized pictures and information defining first individual picture representation parameter settings have been stored, said digitized picture playback apparatus comprising:

a read unit for reading the digitized pictures from the digital data base medium;

a picture processing unit for converting the digitized pictures read by the read unit into a picture signal suitable for application to a reproduction apparatus for reproducing a visible representation of the picture signal, wherein the picture processing unit processes the digitized pictures in accordance with picture representation parameter settings supplied to the picture processing unit so as to cause amended presentations of the individual pictures on said reproduction apparatus;

first means for detecting, on said digital data base medium, a data base identification uniquely identifying the digital data base medium present in the digitized picture playback apparatus; and manually operable entry means for entering second individual picture representation parameter settings, characterized in that the apparatus further comprises:

means for reading, from the digital data base medium, said information defining said first individual picture representation parameter settings;

means for storing in a memory, together with a data base identification, differences between the respective information defining said first individual picture representation parameter settings stored in the digital data base medium and the second individual picture representation parameter settings entered via said entry means, said differences being information defining said second individual picture representation parameter settings for individual digitized pictures recorded on the digital data base medium identified by said data base identification;

second means for detecting whether, for said data base identification, information defining second individual picture representation parameter settings is stored in the memory; and user controllable means, responsive to said second means for detecting, for selectively supplying the first or second individual picture representation parameter settings to the picture processing unit as said picture representation parameter settings.

2. A digitized picture playback apparatus as claimed in claim 1, wherein the user controllable means carries out said selection in accordance with a predetermined selection criterion.

3. A digitized picture playback apparatus as claimed in claim 1, characterized in that the picture processing unit comprises means for processing the digitized pictures for producing, on the reproduction apparatus, a magnified representation of a portion of at least one of the digitized pictures in accordance with a magnification factor defined by the picture representation parameter settings selectively supplied to the picture processing unit.

4. A digitized picture playback apparatus as claimed in claim 1, characterized in that the picture processing unit comprises means for processing the digitized pictures for producing, on the reproduction apparatus, a translation of at least one of the digitized pictures by a distance and in a direction as specified by the picture representation parameter settings selectively supplied to the picture processing unit.

5. A digitized picture playback apparatus as claimed in claim 1, characterized in that the picture processing unit comprises means for processing the digitized pictures for producing, on the reproduction apparatus, color or luminance adaptation of at least one of the digitized pictures as specified by the picture representation parameter settings selectively supplied to the picture processing unit.

6. A digitized picture playback apparatus as claimed in claim 1, characterized in that the picture processing unit comprises means for processing the digitized pictures for producing, on the reproduction apparatus, a rotation of at least one of the digitized pictures over an angle in accordance with an orientation specified by the picture representation parameter settings selectively supplied to the picture processing unit.

7. A digitized picture playback apparatus as claimed in claim 1, wherein said memory comprises a non-volatile memory.

8. A digitized picture playback apparatus as claimed in claim 7, wherein said non-volatile memory is an electrically erasable programmable read only memory.

9. A digitized picture playback apparatus as claimed in claim 8, wherein said memory is an integral part of the apparatus.

10. A digitized picture playback apparatus as claimed in claim 8, wherein said memory is removably engageable with the apparatus.

11. A digitized picture playback apparatus for retrieving pictures from a digital data base medium in which digitized pictures and information defining first individual picture representation parameter settings have been stored, said digitized picture playback apparatus comprising:

an optical compact disc player for reading a compact disc, comprising said digital data base medium, on which a plurality of digitized pictures are stored in accordance with a format in which the digitized pictures form a CD signal and are included in blocks with a length which corresponds to a subcode frame in the CD signal;

deformatting means coupled to said optical compact disc player for separating the digitized pictures included in the blocks;

a picture processing unit for converting the separated digitized pictures into a picture signal suitable for application to a reproduction apparatus for reproducing a visible representation of the picture signal, wherein the picture processing unit processes the separated digitized pictures in accordance with picture representation parameter settings supplied to the picture processing unit so as to cause amended presentations of the pictures on the reproduction apparatus;

means for reading, from the compact disc, said information defining said first individual picture representation parameter settings;

first means for detecting, on the compact disc, a compact disc identification uniquely identifying the compact disc present in the optical compact disc player;

manually operable entry means for entering second individual picture representation parameter settings;

a memory for storing information defining individual picture representation parameter settings;

means for storing in said memory, together with said compact disc identification, information defining said second individual picture representation parameter settings for individual digitized pictures recorded on the compact disc identified by said compact disc identification, said information comprising differences between respective first individual picture representation parameter setting stored in said compact disc and said second individual picture representation parameter settings entered by said entry means;

second means for detecting whether, for said compact disc identification, information defining second individual picture representation parameter settings is stored in the memory; and user controllable means, responsive to said second means for detecting, for selectively supplying the first or second individual picture representation parameter settings to the picture processing unit as said picture representation parameter settings.

12. A digitized picture playback apparatus as claimed in claim 11, wherein said memory comprises a non-volatile memory.

13. A digitized picture playback apparatus as claimed in claim 12, wherein said non-volatile memory is an electrically erasable programmable read only memory.

14. An apparatus as claimed in claim 12, or 13, wherein said memory is an integral part of the apparatus.

15. An apparatus as claimed in claim 12 or 13, wherein said memory is removably engageable with the apparatus.

* * * * *

UNITED STATES PATENT AND TRADEMARK OFFICE
CERTIFICATE OF CORRECTION

PATENT NO. : 5,543,925
DATED : August 6, 1996
INVENTOR(S) : Timmermans

It is certified that error appears in the above-identified patent and that said Letters Patent is hereby corrected as shown below:

Claim 5, line 9 add "a" before "color".
Claim 11, line 6, change "setting" to "settings".
Claim 14, line 9, delete the comma after "claim 12".

Signed and Sealed this

Seventh Day of April, 1998

Attest:

BRUCE LEHMAN

Attesting Officer  Commissioner of Patents and Trademarks